(12) United States Patent
Srivastava

(10) Patent No.: US 12,442,405 B2
(45) Date of Patent: Oct. 14, 2025

(54) SELF-ALIGNING MECHANICAL FASTENER

(71) Applicant: Ample, Inc., San Francisco, CA (US)

(72) Inventor: Ankit Srivastava, San Francisco, CA (US)

(73) Assignee: Ample, Inc., San Francisco, CA (US)

( * ) Notice: Subject to any disclaimer, the term of this patent is extended or adjusted under 35 U.S.C. 154(b) by 0 days.

(21) Appl. No.: 19/033,796

(22) Filed: Jan. 22, 2025

(65) Prior Publication Data
US 2025/0163953 A1 May 22, 2025

Related U.S. Application Data

(62) Division of application No. 18/056,048, filed on Nov. 16, 2022, now Pat. No. 12,228,161.

(60) Provisional application No. 63/364,074, filed on May 3, 2022.

(51) Int. Cl.
*F16B 35/04* (2006.01)
*B23P 19/04* (2006.01)

(52) U.S. Cl.
CPC .............. *F16B 35/04* (2013.01); *B23P 19/04* (2013.01)

(58) Field of Classification Search
CPC ... B23P 19/04; B25B 5/08; B25B 5/10; F16B 21/165; F16B 35/04
See application file for complete search history.

(56) References Cited

U.S. PATENT DOCUMENTS

| | | | | |
|---|---|---|---|---|
| 3,430,305 | A * | 3/1969 | Ted | B64D 17/383 24/607 |
| 4,573,725 | A * | 3/1986 | Griffiths | B66C 1/66 403/322.3 |
| 7,125,058 | B2 * | 10/2006 | Hawthorne | F42B 10/64 294/82.28 |
| 9,827,615 | B2 * | 11/2017 | Chuang | B23Q 1/0072 |
| 10,883,571 | B2 * | 1/2021 | Jackson | F16G 11/108 |
| 11,858,328 | B2 | 1/2024 | Srivastava et al. | |
| 12,228,161 | B2 | 2/2025 | Srivastava | |
| 2009/0214319 | A1 * | 8/2009 | Bolleboom | F16B 21/165 411/348 |
| 2012/0054998 | A1 * | 3/2012 | Tschida | F16B 19/109 29/426.1 |
| 2014/0223679 | A1 * | 8/2014 | Silverman | F16B 2/14 24/456 |
| 2018/0271604 | A1 * | 9/2018 | Grout | F16B 21/165 |
| 2021/0138594 | A1 * | 5/2021 | Ogata | G01L 5/243 |
| 2022/0126412 | A1 * | 4/2022 | Egger | B25B 5/10 |
| 2022/0314769 | A1 * | 10/2022 | Srivastava | B60L 53/305 |

(Continued)

*Primary Examiner* — Kyle A Cook
(74) *Attorney, Agent, or Firm* — Intrinsic Law Corp.

(57) ABSTRACT

A self-aligning mechanical fastener includes an active apparatus and a passive apparatus and is configured to have locked and unlocked states. The active apparatus includes a motor that drives a shaft in first direction to advance a plunger towards the passive apparatus to transition the fastener to the locked state. The plunger includes a tapered distal end that mechanically engages a locking body. The locking body is moved laterally by the tapered distal end to apply a force to a locking frame that is located in a slot defined in a housing of the passive apparatus. The force causes the mechanical fastener to be locked. To unlock the mechanical fastener, the motor drives the shaft in a second direction to retract the plunger away from the passive apparatus.

1 Claim, 24 Drawing Sheets

(56) References Cited

U.S. PATENT DOCUMENTS

2023/0151918 A1\* 5/2023 Clarke .................... B60P 7/13
                                                    403/42
2024/0067003 A1   2/2024 Tsang et al.

\* cited by examiner

SELF-ALIGNING MECHANICAL FASTENER

CROSS-REFERENCE TO RELATED APPLICATIONS

This application is a divisional of U.S. application Ser. No. 18/056,048, titled "Self-Aligning Mechanical Fastener", filed on Nov. 16, 2022, which claims priority to U.S. Provisional Application No. 63/364,074, titled "Self-Aligning Mechanical Fastener," filed on May 3, 2022, both of which is hereby incorporated by reference.

TECHNICAL FIELD

This application relates generally to mechanical fasteners for mating physical components of an apparatus.

BACKGROUND

Physical components often need to be mated or joined together to form an apparatus. Such components can be mated or joined together with an adhesive (e.g., glue), a clamp, a nail, a screw, a bolt, or a similar device. Screws and bolts include a head and a threaded shaft that is driven into one or more physical components to mechanically secure the components together. A driving apparatus (screwdriver, wrench, Allen wrench, or similar device) drives the head, which causes the threaded shaft to rotate. A bolt or nut can be attached to a proximal end of the threaded shaft, which can be rotatably tightened to generate a mechanical force between the head and the bolt/nut to secure one or more parts therebetween.

In order to drive the head, accurate mechanical alignment is required between the driving apparatus and the head. For example, a screw head or bolt head includes a recessed portion to receive a corresponding end of a flathead or Phillips screwdriver. Bolt heads can also have a raised or recessed hexagonal shape that allows the bolts to be engaged by a wrench. In addition, accurate mechanical alignment is required between the threaded shaft and a bolt or nut to drive the threaded shaft into the bolt/nut.

Although such mechanical alignment can be done manually by a human with relative ease, challenges arise in automated systems. For example, robotic systems need expensive and complex optical devices for guidance and alignment. In addition, robotic systems need to manipulate and keep track of multiple loose/detached components (e.g., screws, bolts, etc.).

This application provides improved and lower-cost alignment systems for mechanical fasteners.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

An aspect of the invention is directed to a self-aligning mechanical fastener comprising an active apparatus and a passive apparatus. The active apparatus includes: an active housing defining a channel that extends along a first axis; a shaft disposed in the channel and extending along the first axis, the shaft having external threads defined on a threaded region; a motor configured to rotate the shaft about the first axis; a plunger having a channel defined from a proximal end to a distal end of the plunger, the channel defined by an internal wall having internal threads that engage the external threads on the threaded region of the shaft, the distal end having a tapered shape; a cap attached to the active housing and disposed at a distal end of the shaft, the cap having a proximal surface and a distal surface, the proximal surface and the active housing defining a gap; and a locking body disposed on the proximal surface of the cap. The passive apparatus includes: an alignment housing having a hole that extends, parallel to the first axis, from a proximal end of the alignment housing towards a distal end of the alignment housing, the hole configured to receive the active housing, the proximal end of the alignment housing forming a tapered alignment guide defined by internal walls of the alignment housing such that the hole has a width that decreases from a proximal end of the alignment guide to a distal end of the alignment guide, the width measured with respect to a second axis that is orthogonal to the first axis; and a pressure frame disposed in a slot defined in the alignment housing, the hole extending through a hollow central region of the pressure frame. The self-aligning mechanical fastener has a locked state and an unlocked state. To transition the self-aligning mechanical fastener from the unlocked state to the locked state: the active housing is inserted into the hole and the locking body is aligned with the pressure frame, the motor causes the shaft to rotate in a first direction to advance the plunger towards the cap, and the distal end of the plunger applies a force on the locking body that causes the locking body to mechanically engage the pressure frame to thereby mechanically secure the active apparatus to the passive apparatus. To transition the self-aligning mechanical fastener from the locked state to the unlocked state: the motor causes the shaft to rotate in a second direction to retract the plunger away from the cap to release the force on the locking body to thereby unlock the active apparatus from the passive apparatus.

In one or more embodiments, the locking body is a first locking body and the self-aligning mechanical fastener further comprises a second locking body disposed on the proximal surface of the cap in the gap, the shaft disposed between the first and second locking bodies. In one or more embodiments, the first and second locking bodies comprise first and second cylinders, respectively.

In one or more embodiments, the slot is defined in part by a planar internal wall in the alignment housing at a distal end of the slot, and the pressure frame has a planar outer surface on a distal side of the pressure frame, the planar outer surface contacting the planar internal wall. In one or more embodiments, the planar outer surface and the planar internal wall are parallel to a plane that is orthogonal to the first axis, the pressure frame has a planar engagement surface that is connected to the planar outer surface, the planar engagement surface and the plane define an acute angle, and the planar engagement surface is configured to engage the locking body when the self-aligning mechanical fastener is in the locked state. In one or more embodiments, the acute angle has a range of about 35° to about 45°.

In one or more embodiments, the acute angle is a first acute angle, the pressure frame has a planar alignment surface that is connected to the planar engagement surface, the planar engagement surface located between the planar alignment surface and the planar outer surface, the planar alignment surface and the plane define a second acute angle, and the planar alignment surface is configured to engage the locking body when the active housing is partially removed from the hole. In one or more embodiments, the first acute angle has a range of about 35° to about 45°, and the second acute angle a range of about 70° to about 80°.

In one or more embodiments, each internal wall that defines the tapered alignment guide has a cross-sectional thickness that increases from a proximal end of the tapered alignment guide to a distal end of the tapered alignment guide, the cross-sectional thickness measured along a respective axis that is orthogonal to the first axis, and the internal walls include opposing first and second walls that are aligned with respect to the second axis. In one or more embodiments, the internal walls include a third wall that is aligned with respect to a third axis that is orthogonal to the first and second axes, the third wall connected to the opposing first and second walls.

In one or more embodiments, the proximal end of the plunger includes a plurality of planar external surfaces that are configured to engage respective planar internal surfaces of the active housing when the shaft is rotated about the first axis, thereby causing the plunger to advance when the self-aligning mechanical fastener transitions from the unlocked state to the locked state and to retract when the self-aligning mechanical fastener transitions from the locked state to the unlocked state.

In one or more embodiments, the pressure frame is configured to float within the slot with respect to the second axis and/or with respect to a third axis that is orthogonal to the first and second axes.

In one or more embodiments, the active apparatus further includes a controller in electrical communication with the motor, the controller configured to: produce a first drive signal that causes the motor to rotate the shaft in the first direction to advance the plunger towards the cap to transition the self-aligning mechanical fastener from the unlocked state to the locked state, and produce a second drive signal that causes the motor to rotate the shaft in the second direction to retract the plunger away from the cap to transition the self-aligning mechanical fastener from the locked state to the unlocked state. In one or more embodiments, the active apparatus includes a limit switch in electrical communication with the controller, the limit switch configured to output a limit-switch signal when the distal end of the plunger is advanced, by rotating the shaft in the first direction, to a predetermined position, and while the self-aligning mechanical fastener system transitions from the unlocked state to the locked state and after the controller receives the limit-switch signal, the controller is configured to produce a stop output signal that causes the motor to stop in response to a feedback signal from the motor. In one or more embodiments, the feedback signal is a drive current of the motor and the controller is configured to produce the stop output signal when the drive current is greater than or equal to a predetermined value.

In one or more embodiments, the predetermined value is a first predetermined value, and while the self-aligning mechanical fastener system transitions from the unlocked state to the locked state and before receiving the limit-switch signal, the controller is configured to produce the stop output signal when the drive current is greater than or equal to a second predetermined value, the second predetermined value greater than the first predetermined value.

In one or more embodiments, the limit switch is a first limit switch, the limit-switch signal is a first limit-switch signal, the predetermined position is a first predetermined position, the active apparatus includes a second limit switch in electrical communication with the controller, the second limit switch configured to output a second limit-switch signal when the distal end of the plunger is retracted, by rotating the shaft in the second direction, to a second predetermined position, and while the self-aligning mechanical fastener system transitions from the locked state to the unlocked state, the controller is configured to produce the stop output signal in response to receiving the second limit-switch signal.

Another aspect of the invention is directed to an assembly comprising: a first object, a second object, an active apparatus attached to the first object, a passive apparatus attached to the second object, and a controller. The active apparatus comprises: an active housing defining a channel that extends along a first axis; a shaft disposed in the channel and extending along the first axis, the shaft having external threads defined on a threaded region; a motor configured to rotate the shaft about the first axis; a plunger having a channel defined from a proximal end to a distal end of the plunger, the channel defined by an internal wall having internal threads that engage the external threads on the threaded region of the shaft, the distal end having a tapered shape; a cap attached to the active housing and disposed at a distal end of the shaft, the cap having a proximal surface and a distal surface, the proximal surface and the active housing defining a gap; and a locking body disposed on the proximal surface of the cap. The passive apparatus comprises: an alignment housing having a hole that extends, parallel to the first axis, from a proximal end of the alignment housing towards a distal end of the alignment housing, the hole configured to receive the active housing, the proximal end of the alignment housing forming a tapered alignment guide defined by internal walls of the alignment housing such that the hole has a width that decreases from a proximal end of the alignment guide to a distal end of the alignment guide, the width measured with respect to a second axis that is orthogonal to the first axis; and a pressure frame disposed in a slot defined in the alignment housing, the hole extending through a hollow central region of the pressure frame. The controller is electrical communication with the motor. The active and passive apparatus are configured to form a self-aligning mechanical fastener having a locked state and an unlocked state. To transition the self-aligning mechanical fastener from the unlocked state to the locked state: the active housing is inserted into the hole and the locking body is aligned with the pressure frame, the controller produces a first drive signal that causes the motor to rotate the shaft in a first direction to advance the plunger towards the cap, and the distal end of the plunger applies a force on the locking body that causes the locking body to mechanically engage the pressure frame to thereby mechanically secure the active apparatus to the passive apparatus. To transition the self-aligning mechanical fastener from the locked state to the unlocked state: the controller produces a second drive signal that causes the motor to rotate the shaft in a second direction to retract the plunger away from the cap to release the force on the locking body to thereby unlock the active apparatus from the passive apparatus.

In one or more embodiments, the controller is disposed on the first object. In one or more embodiments, the first object comprises an interface plate configured to be attached to a vehicle, and the second object comprises a battery tray.

In one or more embodiments, the active apparatus is a first active apparatus, the passive apparatus is a first passive apparatus, the self-aligning mechanical fastener is a first self-aligning mechanical fastener, and the assembly further comprises: a second active apparatus attached to the first object; and a second passive apparatus attached to the second object. The first active apparatus is aligned with the first passive apparatus. The second active apparatus is aligned with the second passive apparatus, the second active apparatus and the second passive apparatus configured to form a second self-aligning mechanical fastener.

Another aspect of the invention is directed to a method for releasably mechanically coupling objects, comprising: inserting an active apparatus into a passive apparatus, the active apparatus mechanically coupled to a first object, the passive apparatus mechanically coupled to a second object. The active apparatus comprises: an active housing defining a channel that extends along a first axis; a shaft disposed in the channel and extending along the first axis, the shaft having external threads defined on a threaded region; a motor configured to rotate the shaft about the first axis; a plunger having a channel defined from a proximal end to a distal end of the plunger, the channel defined by an internal wall having internal threads that engage the external threads on the threaded region of the shaft, the distal end having a tapered shape; a cap attached to the active housing and disposed at a distal end of the shaft, the cap having a proximal surface and a distal surface, the proximal surface and the active housing defining a gap; and a locking body disposed on the proximal surface of the cap. The passive apparatus comprises: an alignment housing having a hole that extends, parallel to the first axis, from a proximal end of the alignment housing towards a distal end of the alignment housing, the hole configured to receive the active housing, the proximal end of the alignment housing forming a tapered alignment guide defined by internal walls of the alignment housing such that the hole has a width that decreases from a proximal end of the alignment guide to a distal end of the alignment guide, the width measured with respect to a second axis that is orthogonal to the first axis; and a pressure frame disposed in a slot defined in the alignment housing, the hole extending through a hollow central region of the pressure frame. The method further comprises: rotating, with the motor, the shaft in a first direction relative to the first axis to advance the plunger towards the cap; mechanically contacting the distal end of the plunger and the locking body; applying a force on the locking body with the distal end of the plunger, the force causing the locking body to mechanically engage the pressure frame; and constraining a movement of the locking body with the distal end of the plunger and the pressure frame to thereby mechanically secure the active apparatus to the passive apparatus.

BRIEF DESCRIPTION OF THE DRAWINGS

For a fuller understanding of the nature and advantages of the concepts disclosed herein, reference is made to the detailed description of preferred embodiments and the accompanying drawings.

DETAILED DESCRIPTION

Figure 1:
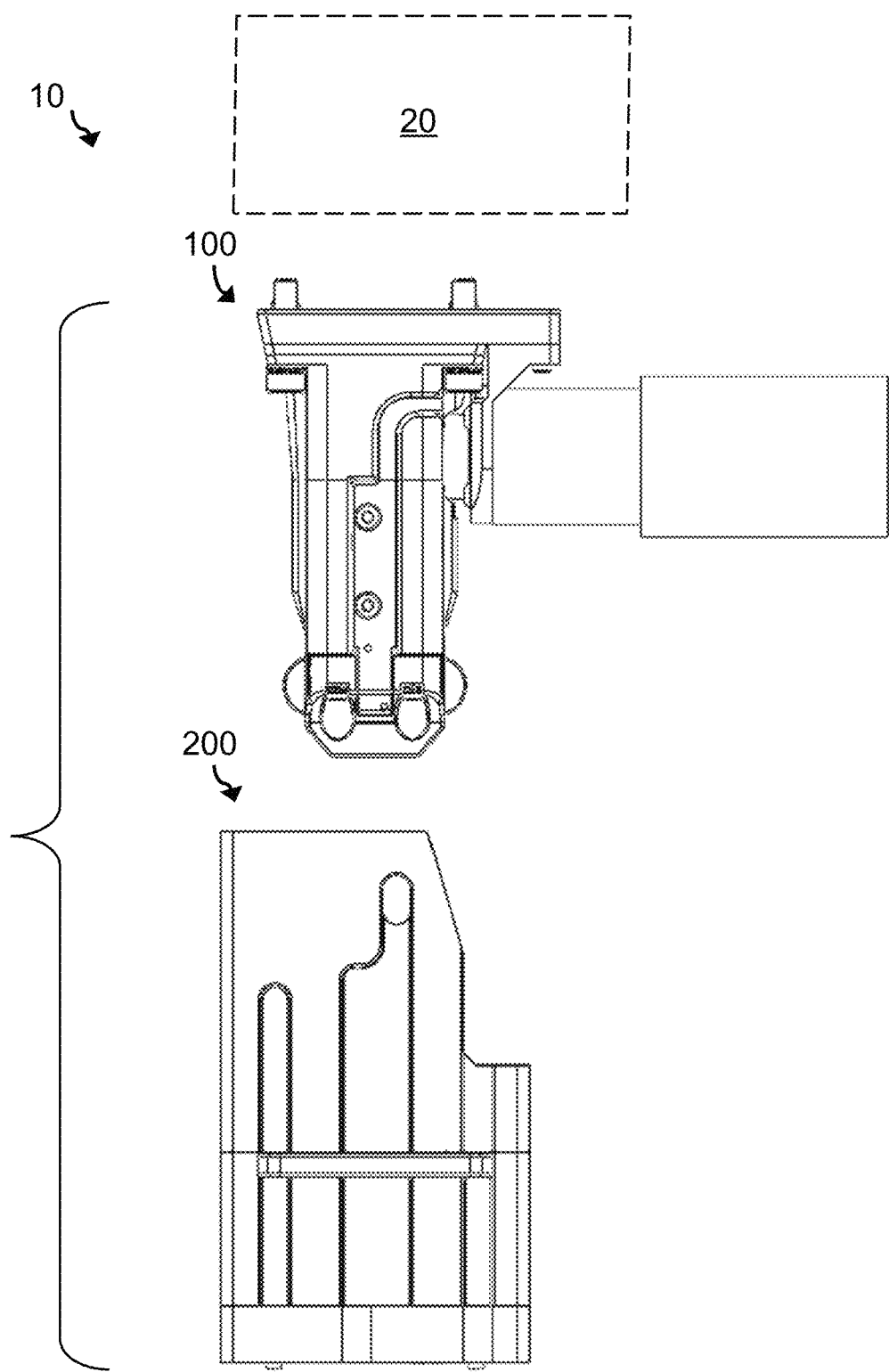
FIG. 1 is a perspective view of a self-aligning mechanical fastener in an unlocked state according to an embodiment.

A self-aligning mechanical fastener includes an active apparatus and a passive apparatus and is configured to have locked and unlocked states. The active apparatus includes one or more locking bodies that can mechanically engage a locking frame in the passive apparatus. The active apparatus includes a motor that can drive a shaft in a first direction to advance a plunger along a vertical axis towards a distal end of the active apparatus and towards the passive apparatus. The plunger includes a tapered distal end that is configured to mechanically engage the locking body(ies) when the plunger is advanced distally. In the locked state, the plunger applies a force on the locking body(ies), which apply a force on the locking frame to mechanically secure the active and passive apparatus. In the unlocked state, the force is released and the plunger is at least partially retracted.

The active apparatus can include a lower limit switch that can be activated when the plunger reaches a predetermined lower position as the fastener transitions from the unlocked state to the locked state. When the lower limit switch is activated, the lower limit switch produces a first limit-switch output signal that can be received by a controller that is also in electrical communication with the motor. As the fastener transitions from the unlocked state to the locked state, the controller can monitor the drive current (or another electrical property) of the motor. Before the controller receives the first limit-switch output signal, the controller can compare the drive current of the motor with a first predetermined maximum drive current. When the drive current exceeds the first predetermined maximum drive current, the controller can generate a stop output signal that causes the motor to stop. After the controller receives the first limit-switch output signal, the controller can compare the drive current of the motor with a second predetermined maximum drive current that is lower than the first predetermined maximum drive current. When the drive current exceeds the second predetermined maximum drive current, the controller can generate the stop output signal to stop the motor. The first predetermined maximum drive current can correspond to a misalignment or damage to the threads on the shaft and/or on the plunger. The second predetermined maximum drive current can correspond to a predetermined locking force applied to the locking body(ies) by the plunger.

In addition, the active apparatus can include an upper limit switch that can be activated when the plunger reaches a predetermined upper position as the fastener transitions from the locked state to the unlocked state. When the upper limit switch is activated, the upper limit switch produces a second limit-switch output signal that can be received by the controller. In response to receiving the second limit-switch output signal, the controller can generate the stop output signal to stop the motor. The second limit-switch output signal can correspond to a fully-retracted position of the shaft and plunger when the fastener is in the unlocked state.

An assembly can include an active apparatus attached to a first object and a passive apparatus attached to a second object. The first and second objects are mechanically coupled when the active and passive apparatus are configured as the self-aligning mechanical fastener in the locked state.

FIG. 1 is a perspective view of a self-aligning mechanical fastener 10 according to an embodiment. The fastener 10 includes an active apparatus 100 and a passive apparatus 200. The active apparatus 100 can be inserted into the passive apparatus 200 where the active and passive apparatus 100, 200 can be releasably locked (e.g., mechanically secured) together to form a fastener.

Figure 2:
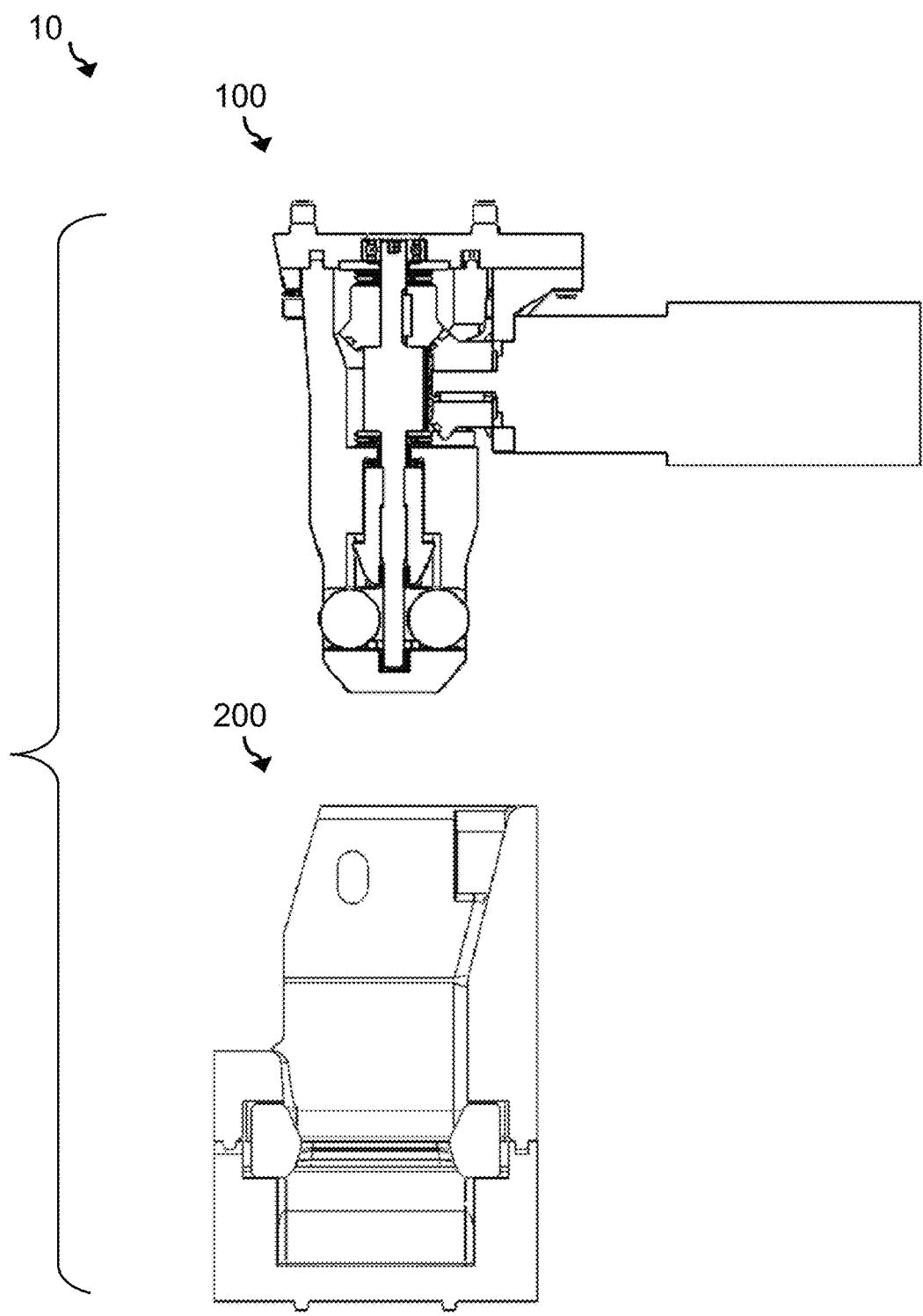
FIG. 2 is a cross-sectional view of the self-aligning mechanical fastener illustrated in FIG. 1.

FIG. 2 is a cross-sectional view of a self-aligning mechanical fastener 10 through plane 20 in FIG. 1. The fastener 10 is in an unlocked state in FIGS. 1 and 2.

Figure 3:
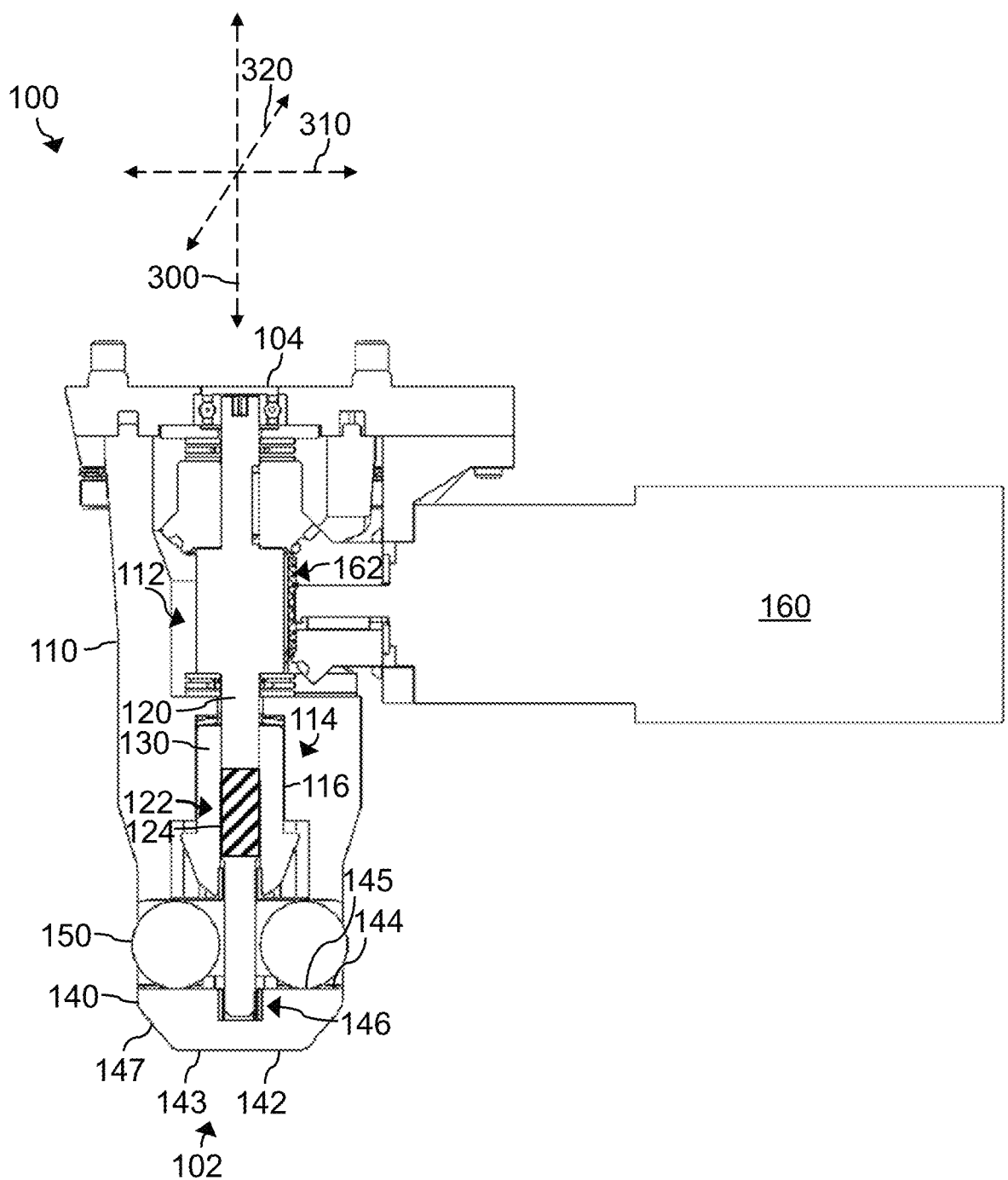
FIG. 3 is an isolated cross-sectional view of the active apparatus illustrated in FIG. 2.

FIG. 3 is an isolated cross-sectional view of the active apparatus 100. The active apparatus 100 includes a housing 110, a shaft 120, a plunger 130, a cap 140, one or more locking bodies 150, and a motor 160. The active apparatus 100 has a distal end 102 (e.g., a first end) and a proximal end 104 (e.g., a second end). The housing 100 defines a hollow region 112 that includes a housing channel 114 that extends along a central vertical axis 300 (e.g., a first axis).

The shaft 120 is located or disposed in the housing channel 114. The shaft 120 extends along or parallel to the first axis 300. In addition, the shaft 120 includes a threaded region 122 on which external threads 124 are defined. The shaft 120 is configured to rotate about the vertical axis 300 similar to a screw or bolt.

Figure 4:
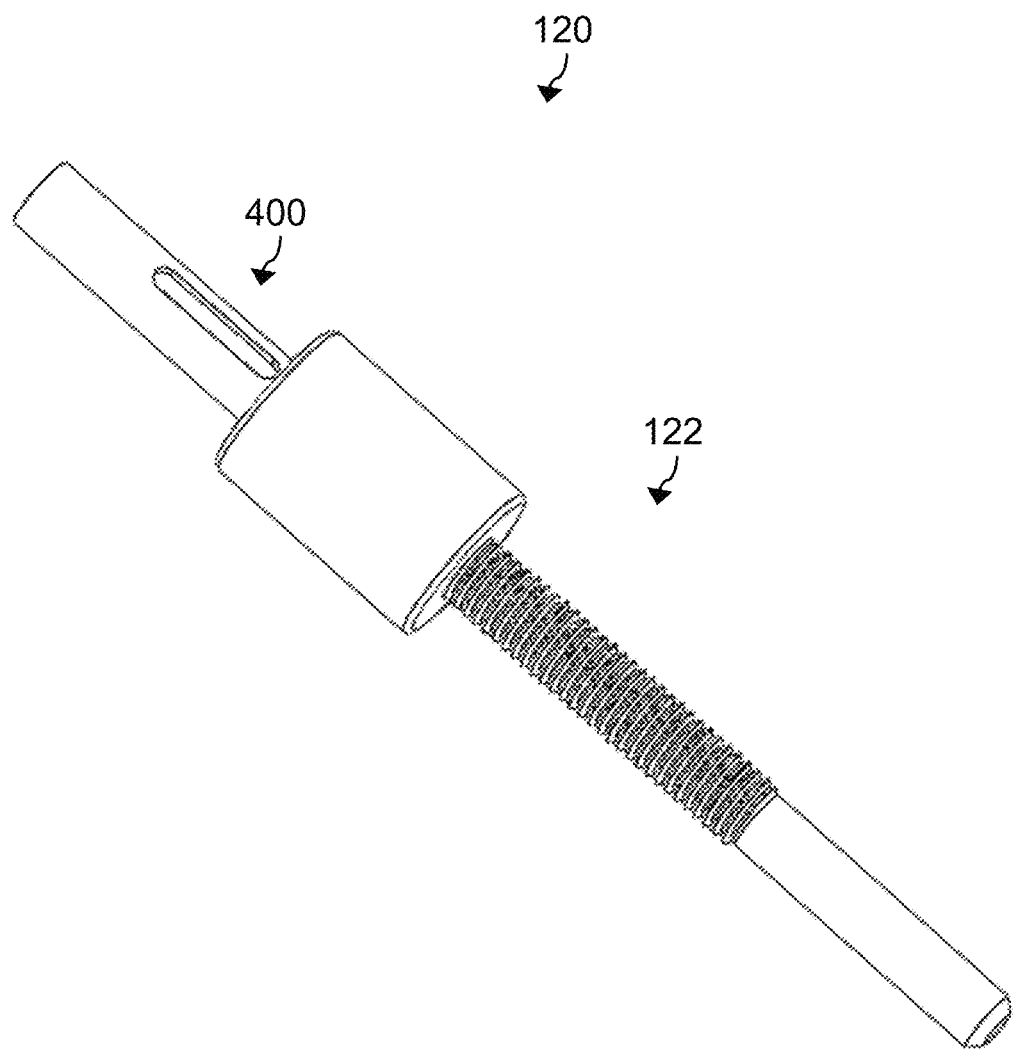
FIG. 4 is an isolated perspective view of the shaft illustrated in FIG. 3.

FIG. 4 is an isolated perspective view of the shaft 120. This view illustrates that a key hole 400 is defined in the shaft 120. The key hole 400 is configured to mechanically engage with bevel gears 162 (FIG. 3) that are driven by the motor 160 to translate a rotational driving force from the motor 160 to the shaft 120, thereby allowing the shaft to rotate in a first direction (e.g., clockwise) about the central vertical axis 300 when the motor 160 is in a first state and in a second direction (e.g., counterclockwise) about the central vertical axis 300 when the motor 160 is in a second state.

Figure 5:
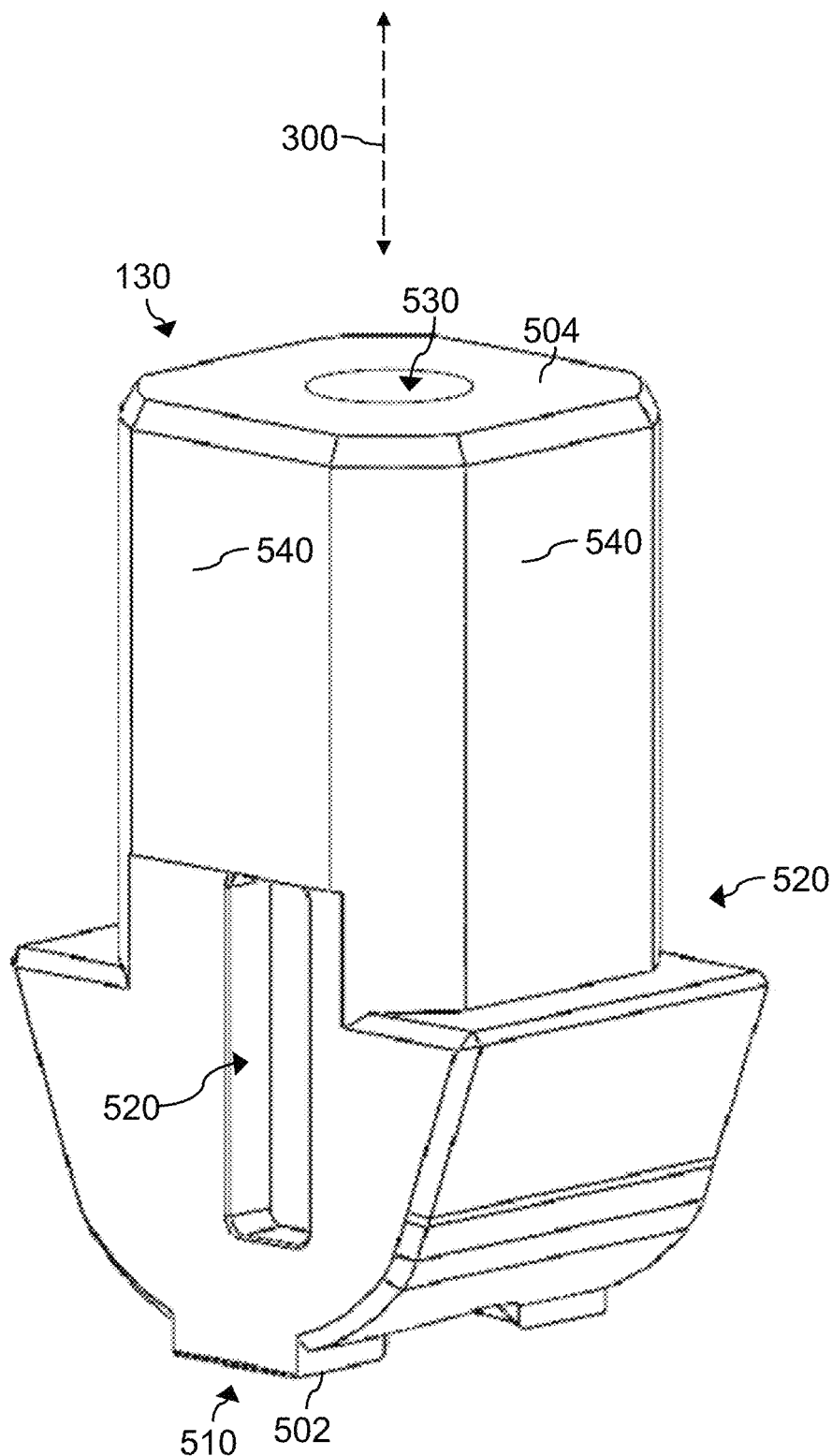
FIGS. 5 and 6 are isolated side perspective views of the plunger illustrated in FIG. 3.

The plunger 130 includes a distal end 502 and a proximal end 504, as illustrated in FIG. 5. The distal end 502 can have a tapered shape such as a wedge, arrow, anchor, or another shape. The distal end 502 can include a planar external surface 510. A slot 520 can be defined on the external surface of a lateral side of the plunger 130. Another slot 520 can be defined on the external surface of the opposing lateral side of the plunger 130. The slots 520 extend parallel to the central vertical axis 300. The plunger 130 can include a plurality of planar external surfaces 540 that are configured to frictionally engage corresponding planar internal surfaces 116 in the housing 110 that define the housing channel 114.

Figure 6:
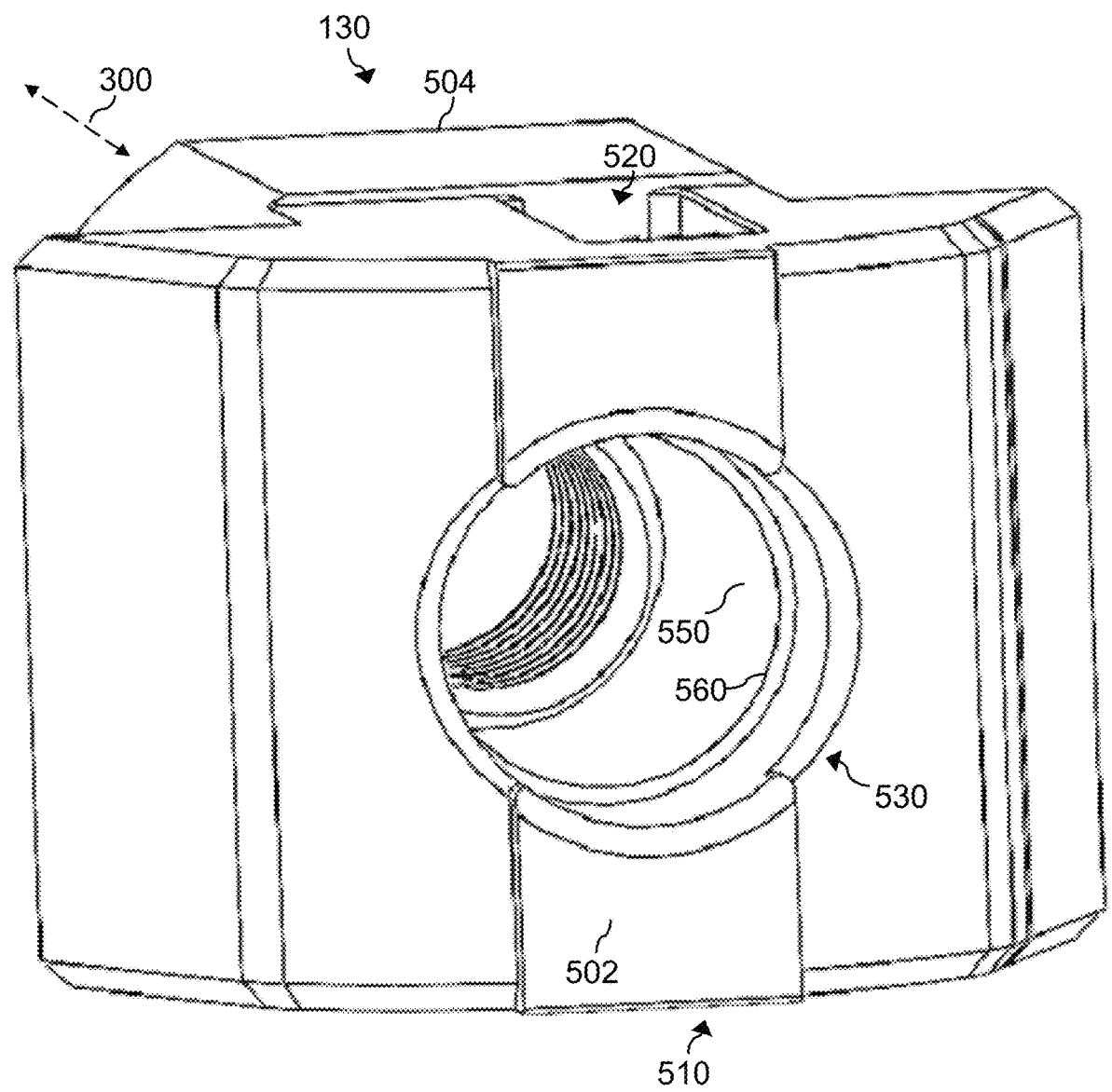

In addition, a plunger channel 530 is defined in the plunger 130, as illustrated in FIG. 6. The plunger channel 530 extends from the proximal end 504 to the distal end 502 of the plunger 130 along and/or parallel to the central vertical axis 300. The plunger channel 530 is defined by an internal wall 550 of the plunger 130. Internal threads 560 are defined in the internal wall 550. The plunger channel 530 is configured to receive the shaft 120 and the internal threads 560 in the internal wall 540 are configured to engage (e.g., rotatingly engage) the external threads 124 on the shaft 120 such that the relative position of the plunger 130 with respect to the shaft 120 is adjustable by rotating the shaft 120 with respect to the plunger 130.

Returning to FIG. 3, the cap 140 is attached to or part of (e.g., integrally connected to) the housing 110. The cap 140 has a distal side 142 and a proximal side 144. The distal side 142 can include a planar distal surface 143. The proximal side 144 includes one or more planar proximal surfaces 145 that are configured to mechanically support the one or more locking bodies 150. A proximal hole 146 can be defined in the proximal side 142 to receive a distal end of the shaft 120. The cap 140 also includes tapered alignment sides 147 that are disposed closer to the central vertical axis 300 at the distal side 142 of the cap 140 than at or near the proximal side 144 of the cap 140. Two opposing tapered sides 147 are illustrated on the left and right sides of the cap 140 in FIG. 3. One or more additional tapered sides 147 can be located in front of and/or behind the cap 140, such as on opposing sides in a cross section orthogonal to the one illustrated in FIG. 3. The tapered sides 147 can be used to align the active apparatus 100 with the passive apparatus 200 as the distal end 102 of the active apparatus 100 is inserted into the passive apparatus 200. The tapered sides 147 illustrated in FIG. 3 can align the active apparatus 100 with respect to a second axis 310 that is orthogonal to the first axis 300. The tapered sides 147 in the cross section orthogonal to the one illustrated in FIG. 3 can align the active apparatus 100 with respect to a third axis 320 that is orthogonal to the first and second axes 300, 310.

Figure 7:
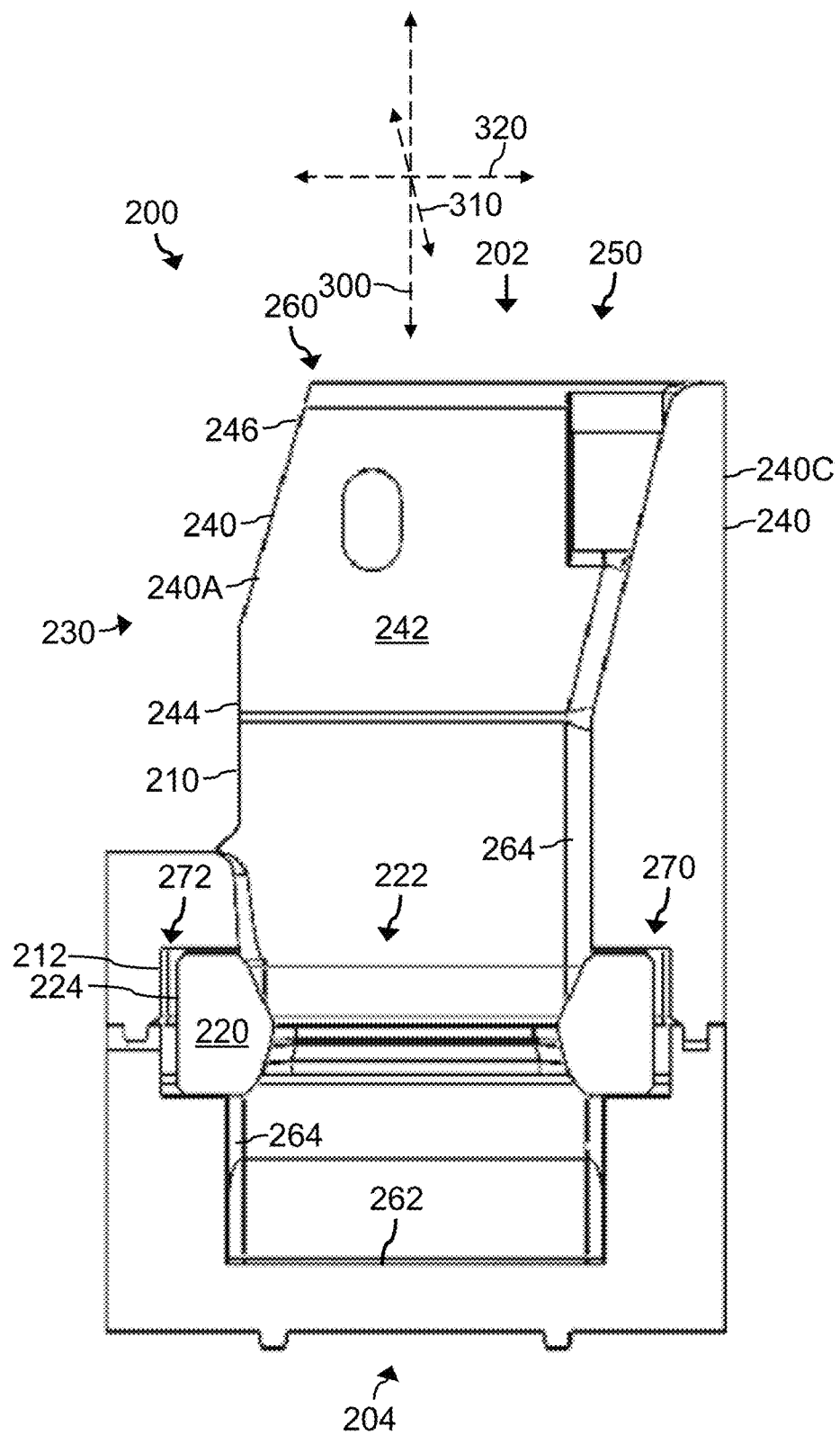
FIG. 7 is an isolated cross-sectional view of the passive apparatus illustrated in FIG. 2.

FIG. 7 is an isolated cross-sectional view of the passive apparatus 200. The passive apparatus 200 includes an alignment housing 210 and a pressure frame 220. The alignment housing 210 includes a tapered alignment guide 230 at a proximal end 202 of the passive apparatus 200 and of the alignment housing 210. The tapered alignment guide 230 includes a plurality of walls 240 having tapered internal surfaces 242 in which a distal end 244 of the internal surfaces 242 is located closer to the central vertical axis 300 than a proximal end 246 of the internal surfaces 242. In an embodiment, the thickness of the walls 240 can be smaller at the proximal end 246 compared to the distal end 244, such that the thickness increases from the proximal end 246 to the distal end 244 to provide walls 240 in which the distal end 244 of the internal surfaces 242 is located closer to the central vertical axis 300 than the proximal end 246 of the internal surfaces 242. In another embodiment, the walls 240 can be of substantially uniform thickness and angled inward to provide walls 240 in which the distal end 244 of the internal surfaces 242 is located closer to the central vertical axis 300 than the proximal end 246 of the internal surfaces 242.

The walls 240 can include a pair of opposing walls (e.g., wall 240A and another wall 240B (not illustrated) on the opposite side of the cross section). The pair of walls 240A, 240B provides a tapered alignment guide 250 with respect to the second axis 310. The walls 240 can also include wall 240C which is located between and orthogonally with respect to walls 240A, 240B. Wall 240C provides a tapered alignment guide with respect to the third axis 320. An optional opposing wall 240 to wall 240C (e.g., wall 240D (not illustrated)) can further provide a tapered alignment guide, in combination with wall 240C, with respect to the third axis 320.

The housing 210 defines a hole or channel 260 that extends from the proximal end 202 towards the distal end 204 of the passive apparatus 200 along or parallel to the central vertical axis 300. The hole 260 is configured to receive the active apparatus 100. The proximal portion of the hole 260 is at least partially defined by the walls 240 (e.g., walls 240A-C or walls 240A-D). An internal planar wall or surface 262 and internal sidewalls 264 of the housing 210 further define the hole 260. The hole 260 extends through a hollow central region 222 of the pressure frame 220.

The housing 210 also defines a slot 270 that is configured to receive and/or retain the pressure frame 220. The slot 270 is configured to provide a gap 272 between an outside edge 224 of the pressure frame 220 and one of the planar internal housing walls 212 that partially defines the slot 270. The gap 272 allows the pressure frame 220 to float within the slot 270 with respect to the third axis 320 such that the pressure frame 220 can slide in either direction along the third axis 320 up to the length of the gap 272 to allow the pressure frame 220 to float within the slot 270 with respect to (or parallel to) the third axis 320.

Figure 8:
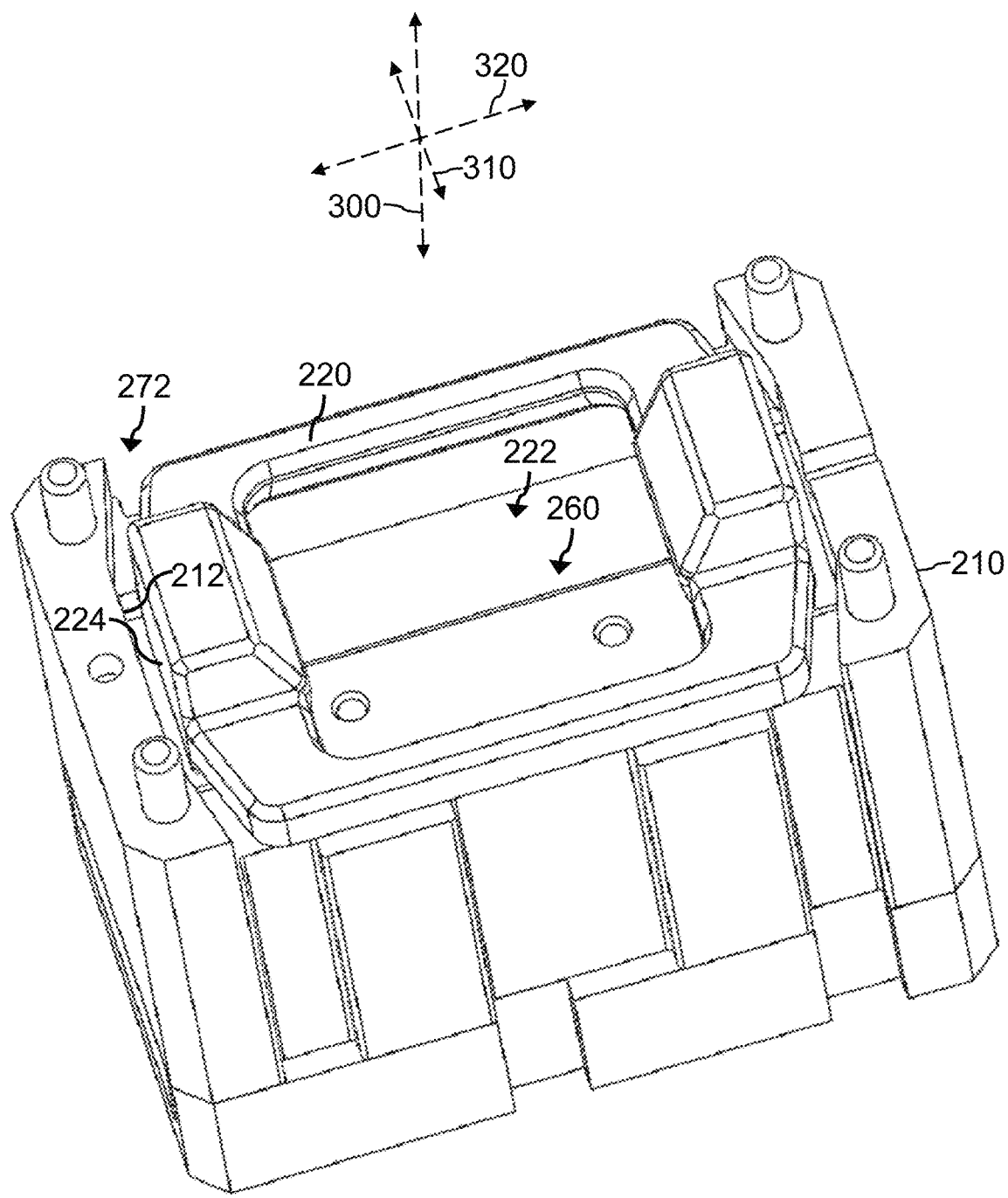
FIG. 8 is an isolated perspective view of a pressure frame floating on a lower portion of a housing.
Figure 9:
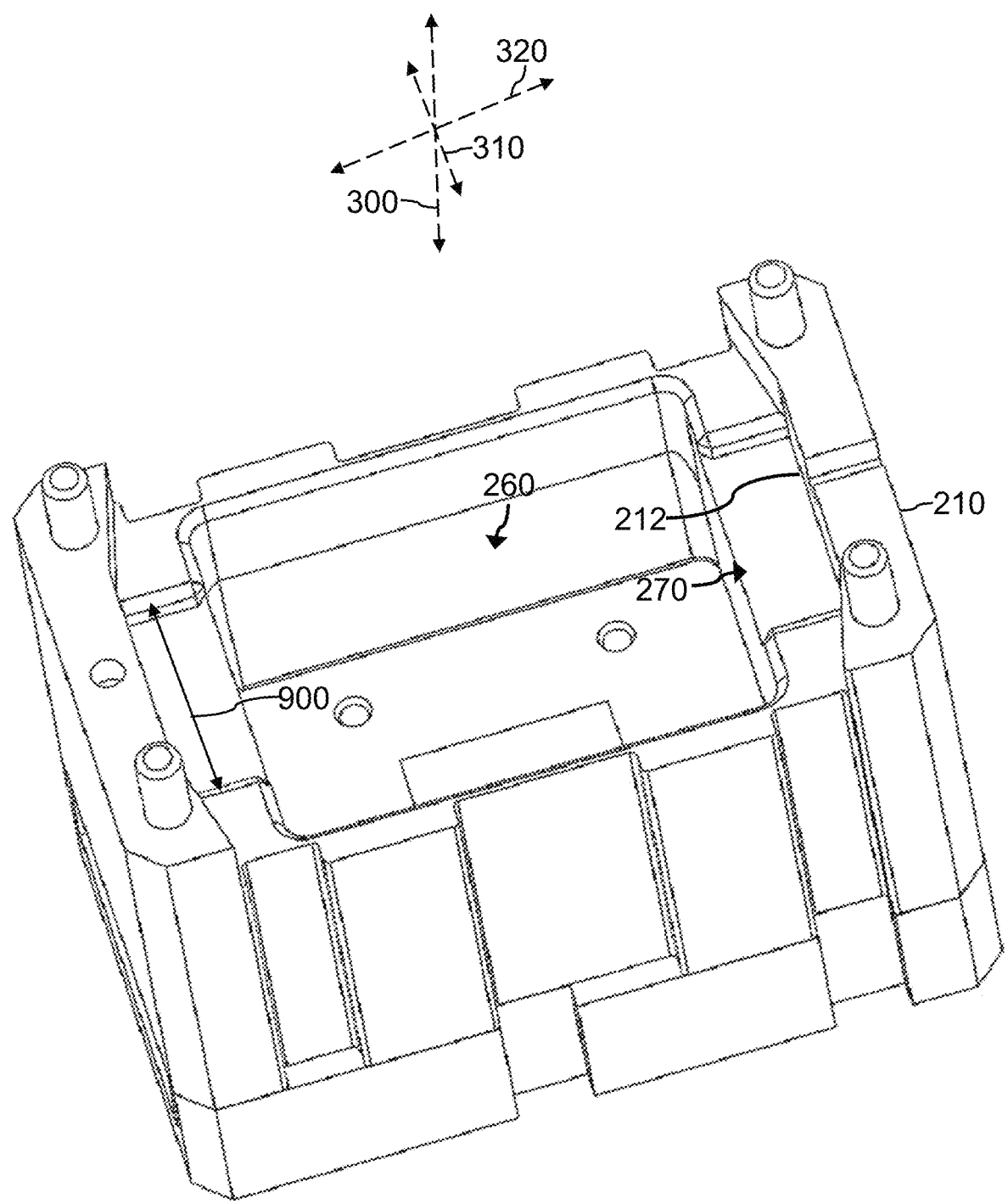
FIG. 9 is an isolated perspective view of the lower portion of the housing with the pressure frame removed.
Figure 10:
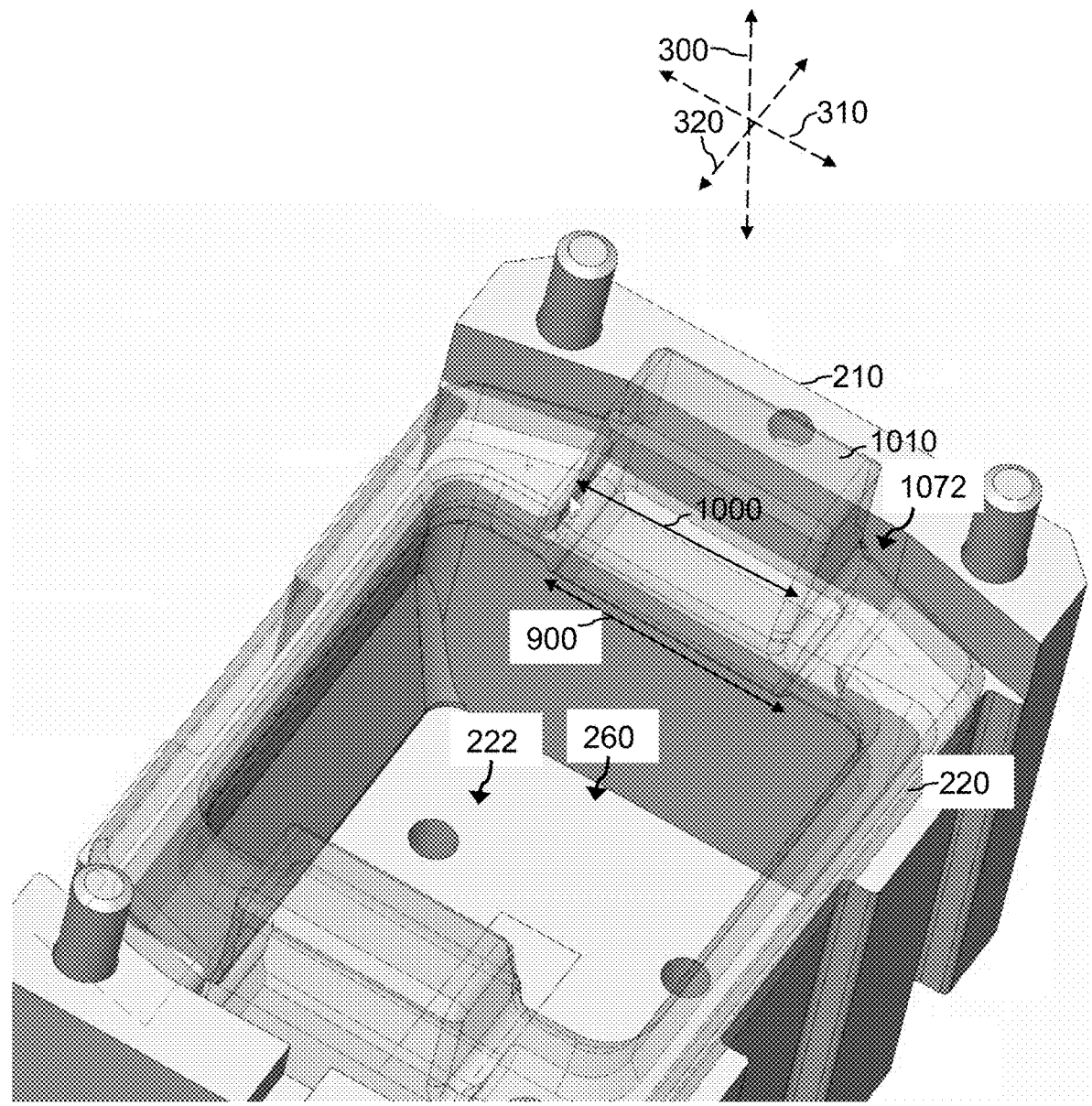
FIG. 10 is an isolated partially-transparent perspective view of the lower portion of the housing and the pressure frame.

FIG. 8 is an isolated perspective view of the pressure frame 220 on the lower portion of the housing 210 to further illustrate the gap 272 with respect to (or parallel to) the third axis 320. FIG. 9 is an isolated perspective view of the lower portion of the housing 210 with the pressure frame 220 removed to further illustrate the slot 270. The length 900 of the slots 270, measured with respect to the second axis 310, is larger than a corresponding length 1000 of a body portion 1010 of the pressure frame 220 that is configured to be disposed in the slot 270, as illustrated in FIG. 10, which is an isolated partially-transparent perspective view of the lower portion of the housing 210 and the pressure frame 220. The difference between the length 900 of the slots 270 and the length 1000 of the body portion 1010 of the pressure frame 220 provides a gap 1072 with respect to (or parallel to) the second axis 310. The gap 1072 allows the pressure frame 220 to float within the slot 270 with respect to the second axis 310 such that the pressure frame 220 can slide in either direction along the second axis 310 up to the length of the gap 1072 to allow the pressure frame 220 to float within the slot 270 with respect to (or parallel to) the third axis 310. The ability of the pressure frame 220 to float with respect to (or parallel to) the second axis 310 and/or the third axis 320 provides an additional self-alignment feature of the fastener 10.

Figure 11:
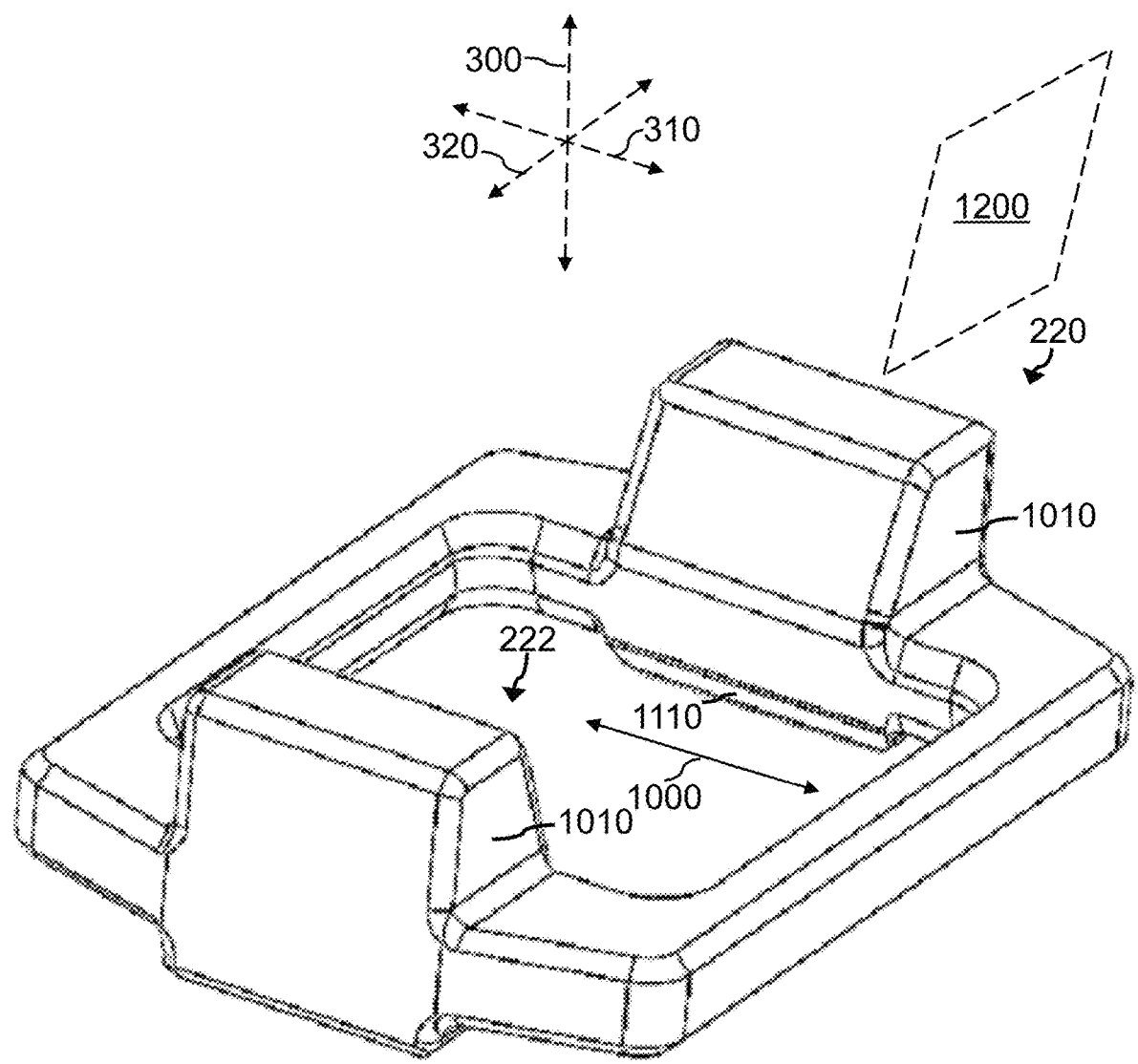
FIG. 11 is an isolated isometric perspective view of the pressure frame illustrated in FIG. 8.

FIG. 11 is an isolated isometric perspective view of the pressure frame 220 according to an embodiment. The pressure frame 220 includes opposing body portions 1010 that are aligned along (or parallel to) the third axis 320. Each body portion 1010 includes a body projection 1110 that extends away from the pressure frame 220 (e.g., parallel to the vertical axis 300) and configured to be received in the slot 270. The length 1000 of the body portion 1010, including the body projection 1110, is smaller than the corresponding length 900 (FIGS. 9 and 10) of the slots 270 to allow the pressure frame 220 to float within the slot 270 with respect to (or parallel to) the third axis 310.

Figure 12:
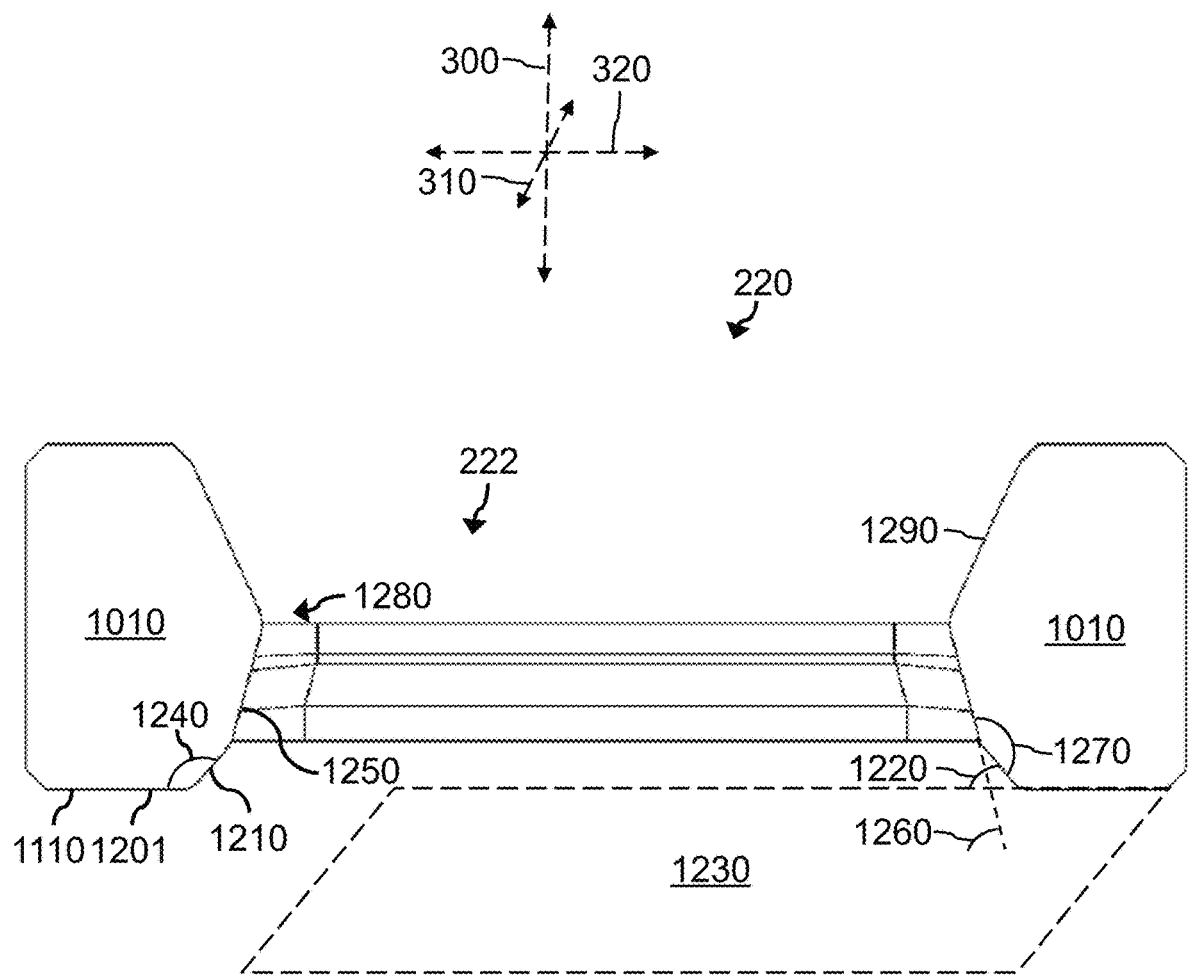
FIG. 12 is a cross-section view of the pressure frame illustrated in FIG. 11.

FIG. 12 is a cross-sectional view of the pressure frame 220 through plane 1200 in FIG. 11. The body projection 1110 includes a planar sliding surface 1201 on a distal side of the pressure frame 220. The planar sliding surface 1201 is parallel to the plane defined by the second and third axes 310, 320. The planar sliding surface 1201 is configured to rest on and slidingly engage the portion of the frame 210 that defines the slot 270.

Each body portion 1010 also includes a planar engagement surface 1210 that is connected to the planar sliding surface 1201. The planar engagement surface 1210 is configured to engage a respective locking body 150 (FIG. 3) when the fastener 10 is in the locked state. The planar engagement surface 1210 is angled inwardly towards the hollow central region 222 of the pressure frame 220. The planar engagement surface 1210 is oriented at an acute angle 1220 with respect to a plane 1230 defined by the planar sliding surface 1201. In addition, the planar engagement surface 1210 is oriented at an obtuse angle 1240 with respect to the planar sliding surface 1201. The acute angle 1220 can have a range of about 30° to about 50°, including about 35°, about 40°, about 45°, and/or any value or range between any two of the foregoing angles. The obtuse angle 1240 can have a range of about 130° to about 150°, including about 135°, about 140°, about 145°, and/or any value or range between any two of the foregoing angles. The sum of the acute angle 1220 and the obtuse angle 1240 is preferably about 180°.

Each body portion 1010 can also include a planar alignment surface 1250 that is connected to the planar engagement surface 1210. The planar engagement surface 1210 is disposed between the planar sliding surface 1201 and the planar alignment surface 1250. The planar alignment surface 1250 is angled inwardly towards the hollow central region 222 of the pressure frame 220 and is configured to engage a respective locking body 150 (FIG. 3) during the transition from the unlocked state to the locked state. The planar alignment surface 1250 is oriented at an acute angle 1260 with respect to the plane 1230. In addition, the planar alignment surface 1250 is oriented at an obtuse angle 1270 with respect to the planar engagement surface 1210. The acute angle 1260 can have a range of about 65° to about 85°, including about 70°, about 75°, about 80°, and/or any value or range between any two of the foregoing angles, including about 70° to about 80°. The obtuse angle 1270 can have a range of about 95° to about 115°, including about 100, about 105°, about 110°, and/or any value or range between any two of the foregoing angles. The sum of the acute angle 1260 and the obtuse angle 1270 is preferably about 180°.

The inner edge of the planar alignment surface 1250 defines a catch fillet 1280 that is configured to catch and engage the respective locking body 150 as a safety mechanism in the event that the active apparatus 100 is only partially inserted into the passive apparatus 200 (or vice versa). The catch fillets 1280 can hold the locking bodies 150 (and thus the active apparatus 100) and the distal movement of the plunger 140 can cause the locking bodies 150 to slide along the planar alignment surface 1250 to fully insert the active apparatus 100 into the passive apparatus 200 (or vice versa).

Each body portion 1010 can also include a planar surface 1290 that is angled outwardly from the hollow central region 222 of the pressure frame 220.

Figure 13:
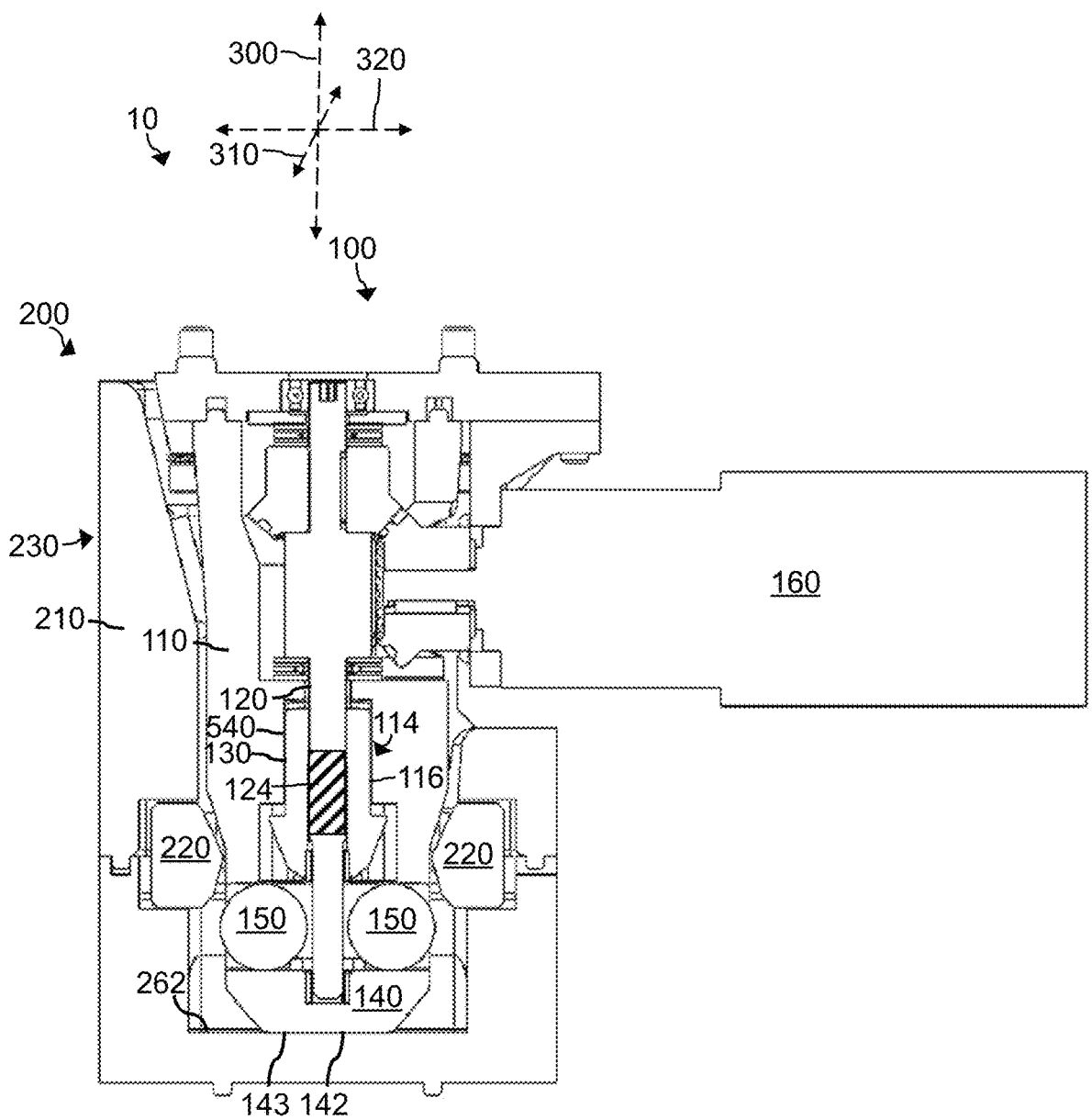
FIG. 13 is a cross-sectional view of the self-aligning mechanical fastener in an inserted state.
Figure 14:
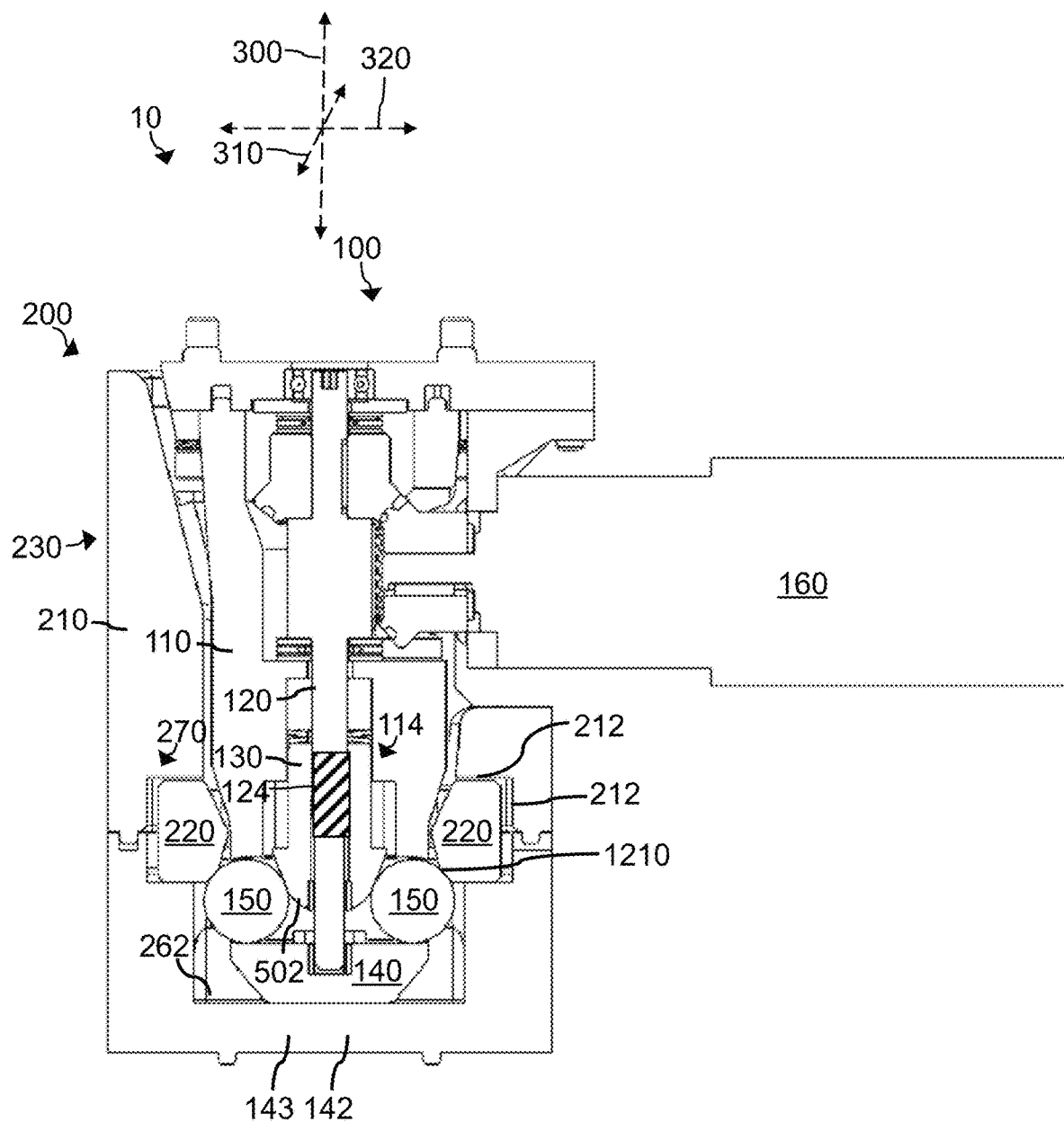
FIG. 14 is a cross-sectional view of the self-aligning mechanical fastener in a locked state.

FIG. 13 is a cross-sectional view of the fastener 10 in an inserted state. The fastener 10 is also in the unlocked state. The cross sections of fastener 10 in FIGS. 2 and 13 are the same while the relative positions of the active apparatus 100 and the passive apparatus 200 are different. In FIG. 13, the active apparatus 100 is inserted into the hole or channel 260 (e.g., FIGS. 7-10) in the passive apparatus 200. In this relative position, the planar distal surface 143 of the cap 140 is disposed on the internal planar surface 262 of the housing 210 of the passive apparatus 200. To transition from the unlocked state to the locked state, the motor 160 is activated to rotate the shaft 120 in a first direction (e.g., clockwise) to cause the external threads 124 on the shaft 120 to rotationally engage the internal threads 560 (FIG. 6) in the plunger 130. The rotational engagement causes the planar external surfaces 540 of the plunger 130 to frictionally engage the corresponding planar internal surfaces 116 in the housing 110, which causes the plunger 130 to move downward, along the central vertical axis 300, towards the cap 140, as illustrated in FIG. 14.

Figure 15:
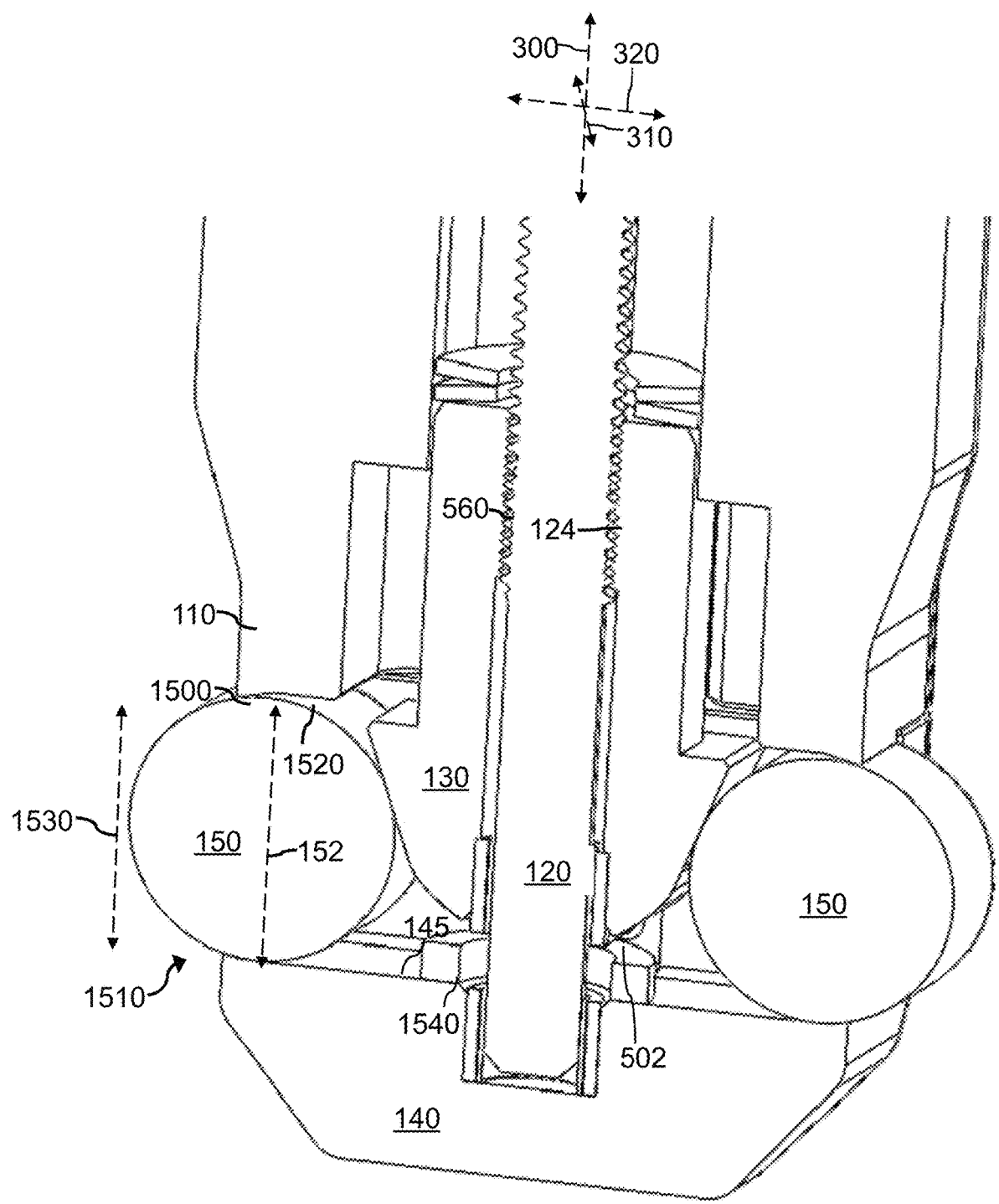
FIG. 15 is an enlarged view of a distal end of the active apparatus when the self-aligning mechanical fastener is in the locked state.

When the plunger 130 moves downward, the tapered distal end 502 of the plunger 130 physically contacts and mechanically engages the inner side of the locking bodies 150 to apply a force thereto, causing the locking bodies 150 to slide and/or rotate laterally along or parallel to the second axis 320 (e.g., away from the central vertical axis 300), as illustrated in FIG. 15. When the locking bodies 150 slide and/or rotate laterally, the outer side of the locking bodies 150 physically contacts and mechanically engages the planar engagement surface 1210 of the locking frame 220, thereby placing the fastener 10 in the locked state. In the locked state, the plunger 130 applies an outward force on the locking bodies 150, which apply a force on the locking frame 220. The position of the locking frame 220 is limited and/or restricted by the internal housing walls 212 that define the slot 270, thereby locking (e.g., mechanically securing) the active and passive apparatus 100, 200.

FIG. 15 also illustrates that the housing 110 includes a lip, ridge, or downward projection 1500 that extends towards the cap 140 parallel to the central vertical axis 300. The lip 1500 reduces a height 1530 of a gap 1510 between a distal side 1520 of the housing 110 and the planar proximal surface 145 of the cap 140, the height 1530 measured with respect to the central vertical axis 300. The height 1530 between the lip 1500 and the planar proximal surface 145 is smaller than a corresponding dimension 152 (e.g., height or diameter) of the locking body 150, which can limit lateral movement of the respective locking body 150 (e.g., parallel to the third axis 330). Additionally or alternatively, the planar proximal surface 145 can include a lip, ridge, or upward projection (e.g., that extends towards the housing 110 parallel to the central vertical axis 300) to reduce the height 1530 of the gap 1510.

FIG. 15 further illustrates an optional ring 1540 around the shaft 120 on the planar proximal surface 145 of the cap 140. The ring 1540 can be formed of a relatively soft or compliant material, such as rubber or plastic, to prevent the plunger 130 from contacting the cap 140 in the event that the plunger 130 is advanced too far downward along the central vertical axis 300. The ring 1540 can prevent or reduce damage to the plunger 130 and/or to the cap 140.

To transition from the locked state to the unlocked state, the motor 160 is activated to rotate the shaft 120 in a second direction (e.g., counterclockwise) to cause the external threads 124 on the shaft 120 to rotationally engage the internal threads 560 (FIG. 6) in the plunger 130. The rotational engagement causes the planar external surfaces 540 (FIG. 13) of the plunger 130 to frictionally engage the corresponding planar internal surfaces 116 (FIG. 13) in the housing 110, which causes the plunger 130 to move upward, along the central vertical axis 300, away from the cap 140, as illustrated in FIG. 13. As the plunger 130 moves upwards, the planar alignment surface 1250 contacts the outer side of the locking bodies 150 and pushes them inwardly toward the central vertical axis 300. The active and passive apparatus 100, 200 can then be separated. For example, gravity can cause the passive apparatus 200 to slide downward, along the central vertical axis 300, away from the active apparatus 100.

Figure 16:
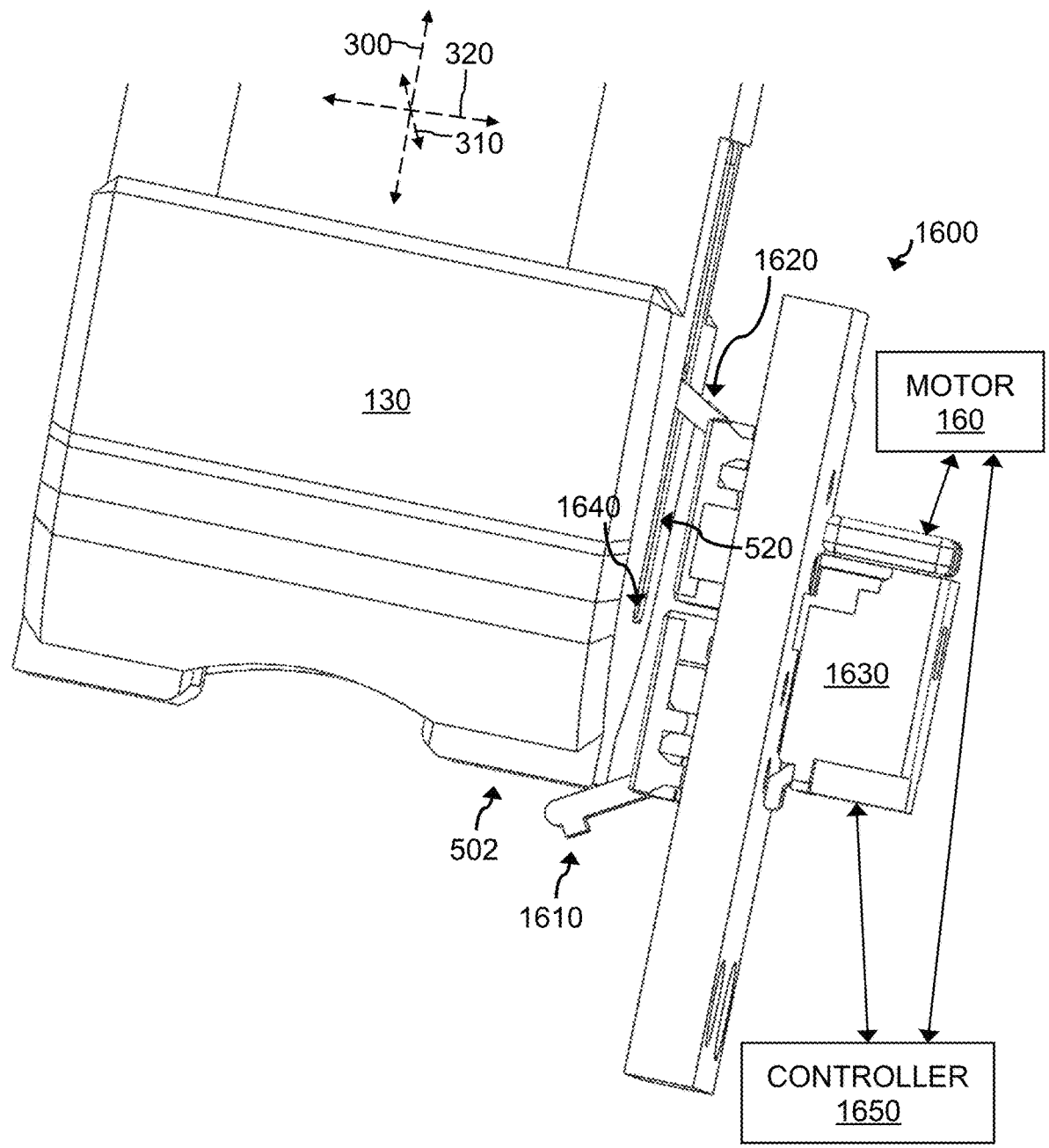
FIG. 16 is a perspective cutaway view of a control system for the self-aligning mechanical fastener when the self-aligning fastener is in a locked state.
Figure 17:
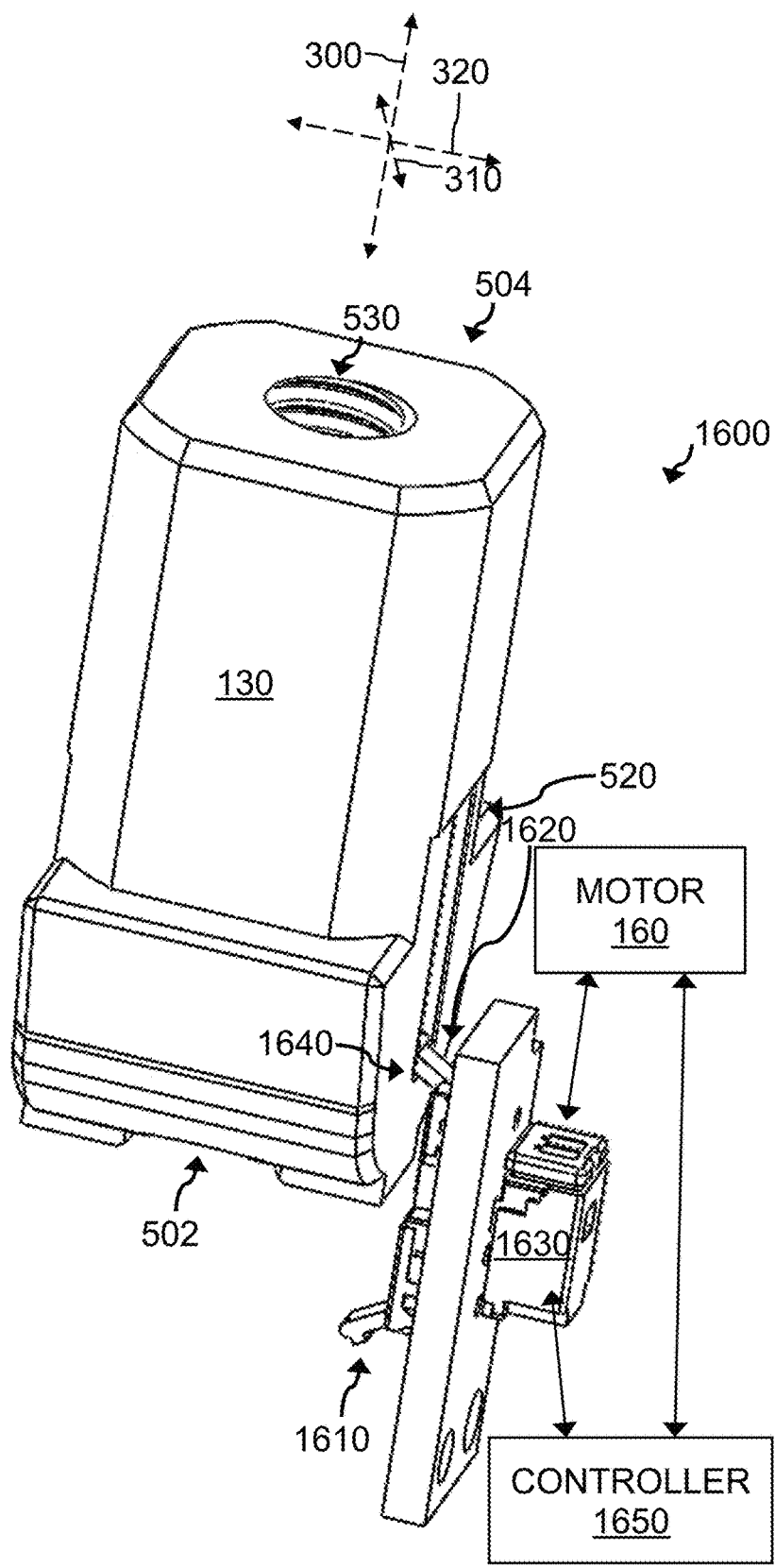
FIG. 17 is a perspective cutaway view of a control system for the self-aligning mechanical fastener when the self-aligning fastener is in an unlocked state.

FIGS. 16 and 17 are perspective cutaway views of a control system 1600 for the fastener 10. The control system 1600 includes a first limit switch 1610 (e.g., a lower limit switch), a second limit switch 1620 (e.g., an upper limit switch), and a controller 1630. The controller 1630 is in electrical communication with the first and second limit switches 1610, 1620. The limit switches 1610, 1620 are located behind and/or within the housing 110 and thus are not viewable in FIGS. 2, 3, 13, and 14.

The first limit switch 1610 is configured to generate a first output signal (e.g., a first limit-switch signal) when the plunger 130 is lowered, along the central vertical axis 300, to a predetermined position, as illustrated in FIG. 16. The predetermined position corresponds to a transition to the locked state of the fastener 10 at the position at which the plunger 130 begins to engage the locking bodies 150, as illustrated in FIGS. 14 and 15. The first limit switch 1610 can be activated (e.g., the state of the first limit switch 1610 can be changed) when the distal end 502 of the plunger 130 physically contacts the first limit switch 1610 and causes the first limit switch 1610 to pivot away from the plunger 130 such as by a predetermined pivot angle (e.g., about 10°, about 15°, about 20°, or another angle) compared to the default or home position of the first limit switch 1610. Additionally or alternatively, the physical contact of the distal end 502 of the plunger 130 and the first limit switch 1610 can change an electrical property (e.g., voltage, current, resistance, impedance, and/or another electrical property) of the first limit switch 1610. For example, the first limit switch 1610 can be electrically conductive and the plunger 130 can be electrically resistive, and the voltage or impedance measured at the first limit switch 1610 can increase when the distal end 502 of the plunger 130 and the first limit switch 1610 are in physical contact compared to when they are physically separated. In another embodiment, the first limit switch 1610 can comprise an optical switch that can change state when the distal end 502 of the plunger 130 is lowered in front of the optical switch.

To transition from the unlocked state to the locked state, the plunger 130 is lowered by rotating the shaft 120 in a first direction with the motor 160 (e.g., FIG. 13). During this transition, the controller 130 can monitor the drive current of the motor 160. The controller 130 can compare the drive current with a first predetermined maximum current. The motor 160 can continue to drive the shaft 120 as long as the drive current remains at or below the first predetermined maximum current. When the controller 130 determines that the drive current is above the first predetermined maximum current, the controller 130 can stop the motor 160 (e.g., by producing a stop output signal). A drive current above the first predetermined maximum current can indicate that the external and internal threads 124, 560 of the shaft 120 and the plunger 130, respectively, are misaligned and/or damaged. The first predetermined maximum current can be about 4 amps, about 5 amps, about 6 amps, or any value or range between any two of the foregoing currents.

When the controller 1630 receives the first output signal, the controller 1630 begins to compare the drive current with a second predetermined maximum current that is lower than the first predetermined maximum current. The second predetermined maximum current can be about 3 amps, about 3.5 amps, about 4 amps, about 4.5 amps, or any value or range between any two of the foregoing currents. A drive current above the second predetermined maximum current can indicate that a minimum force is applied by the plunger 130 to the locking bodies 150 to transition the fastener 10 to the locked state. The controller 130 stops the motor 160 (e.g., by producing a stop output signal) when the drive current is above the second predetermined maximum current.

The second limit switch 1620 is configured to generate a second output signal (e.g., a second limit-switch signal) when the plunger 130 is raised, along the central vertical axis 300, to a predetermined position, as illustrated in FIG. 17. The predetermined position corresponds to the unlocked state of the fastener 10 at the position at which the plunger 130 is disengaged and retracted from the locking bodies 150. The second limit switch 1620 is located in the slot 520 defined in the plunger 130. When the plunger is raised to the predetermined position, a distal or bottom edge 1640 of the slot 520 can physically contact and activate (e.g., change the state of) the second limit switch 1620. For example, the second limit switch 1620 can be activated when the bottom edge 1640 of the slot 520 physically contacts the second limit switch 1620 and causes the second limit switch 1620 to pivot away from the plunger 130 such as by a predetermined pivot angle (e.g., about 10°, about 15°, about 20°, or another angle) compared to the default or home position of the second limit switch 1620. Additionally or alternatively, the physical contact of the bottom edge 1640 of the slot 520 and the second limit switch 1620 can change an electrical property (e.g., voltage, current, resistance, impedance, and/or another electrical property) of the second limit switch 1620. For example, the second limit switch 1620 can be electrically conductive and the plunger 130 can be electrically resistive, and the voltage or impedance measured at the second limit switch 1620 can increase when the bottom edge 1640 of the slot 520 and the second limit switch 1620 are in physical contact compared to when they are physically separated. In another embodiment, the second limit switch 1620 can comprise an optical switch that can change state when the bottom edge 1640 of the slot 520 is lowered in front of the optical switch.

To transition from the locked state to the unlocked state, the plunger 130 is raised by rotating the shaft 120 in a second direction with the motor 160. During this transition, the controller 130 can monitor the drive current of the motor 160. The controller 130 can compare the drive current with the first predetermined maximum current. The motor 160 can continue to drive the shaft 120 as long as the drive current remains at or below the first predetermined maximum current, which can indicate that the external and internal threads 124, 560 of the shaft 120 and the plunger 130, respectively, are misaligned and/or damaged, as discussed above. When the controller 1630 receives the second output signal, the controller 1630 causes the motor 160 to stop (e.g., by producing a stop output signal).

In an alternative embodiment, reference number 1630 can represent electronics and/or a local controller for the limit switches 1610, 1620 and/or another controller 1650 can be configured to perform some or all of the functionality described above with respect to controller 1630. For example, controller(s) 1630 and/or 1650 can monitor the drive current of the motor 160 and can compare the drive current with the first and/or second predetermined maximum current(s). The controller(s) 1630 and/or 1650 can also stop the motor 160 (e.g., by producing a stop output signal) if/when the drive current exceeds the first and/or second predetermined maximum current(s) and/or in response to the second output signal from the second limit switch 1620. In this embodiment, the electronics and/or local controller 1630 can send an output signal to the controller 1650 that indicates that the first limit switch 1610 has been activated and/or that the second limit switch 1620 has been activated. Additionally or alternatively, the electronics and/or a local controller 1630 can relay the first output signal and/or the second output signal to the controller 1650.

The controller(s) 1630 and/or 1650 can produce a first drive signal that causes the motor 160 to rotate the shaft 120 in a first direction (e.g., clockwise) to transition the fastener 10 from the unlocked state to the locked state. The controller(s) 1630 and/or 1650 can produce a second drive signal that causes the motor 160 to rotate the shaft 120 in a second direction (e.g., counterclockwise) to transition the fastener 10 from the locked state to the unlocked state.

Figure 18:
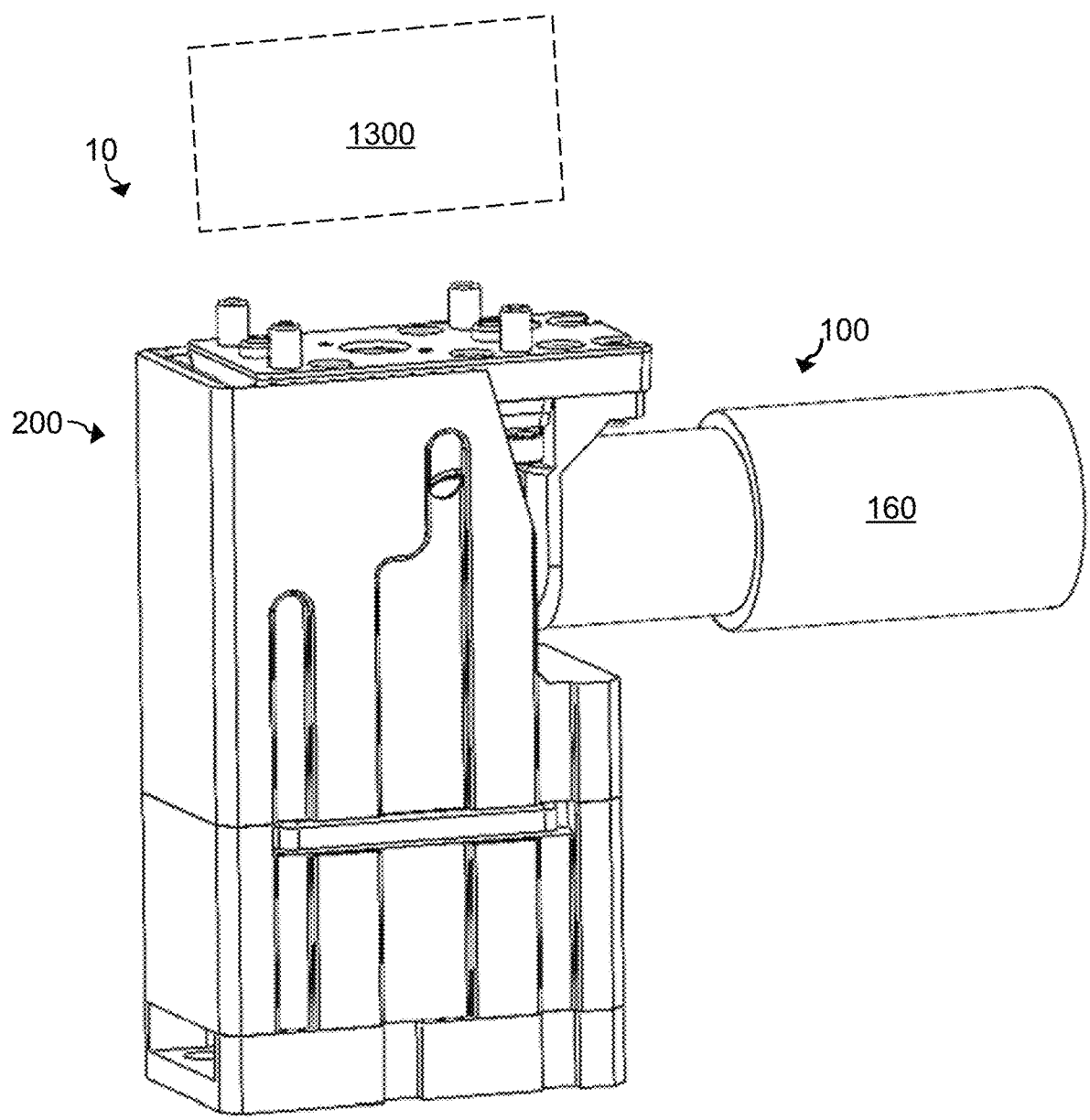
FIG. 18 is a perspective view of the fastener in an inserted and/or locked state.

FIG. 18 is a perspective view of the fastener 10 in an inserted state. The fastener 10 can be in an inserted and unlocked state, as illustrated in FIG. 13, or in an inserted and locked state, as illustrated in FIGS. 14 and 15. The fastener 10 is also in the unlocked state. The cross sections illustrated in FIGS. 13 and 14 are taken through plane 1300 in FIG. 18.

Figure 19:
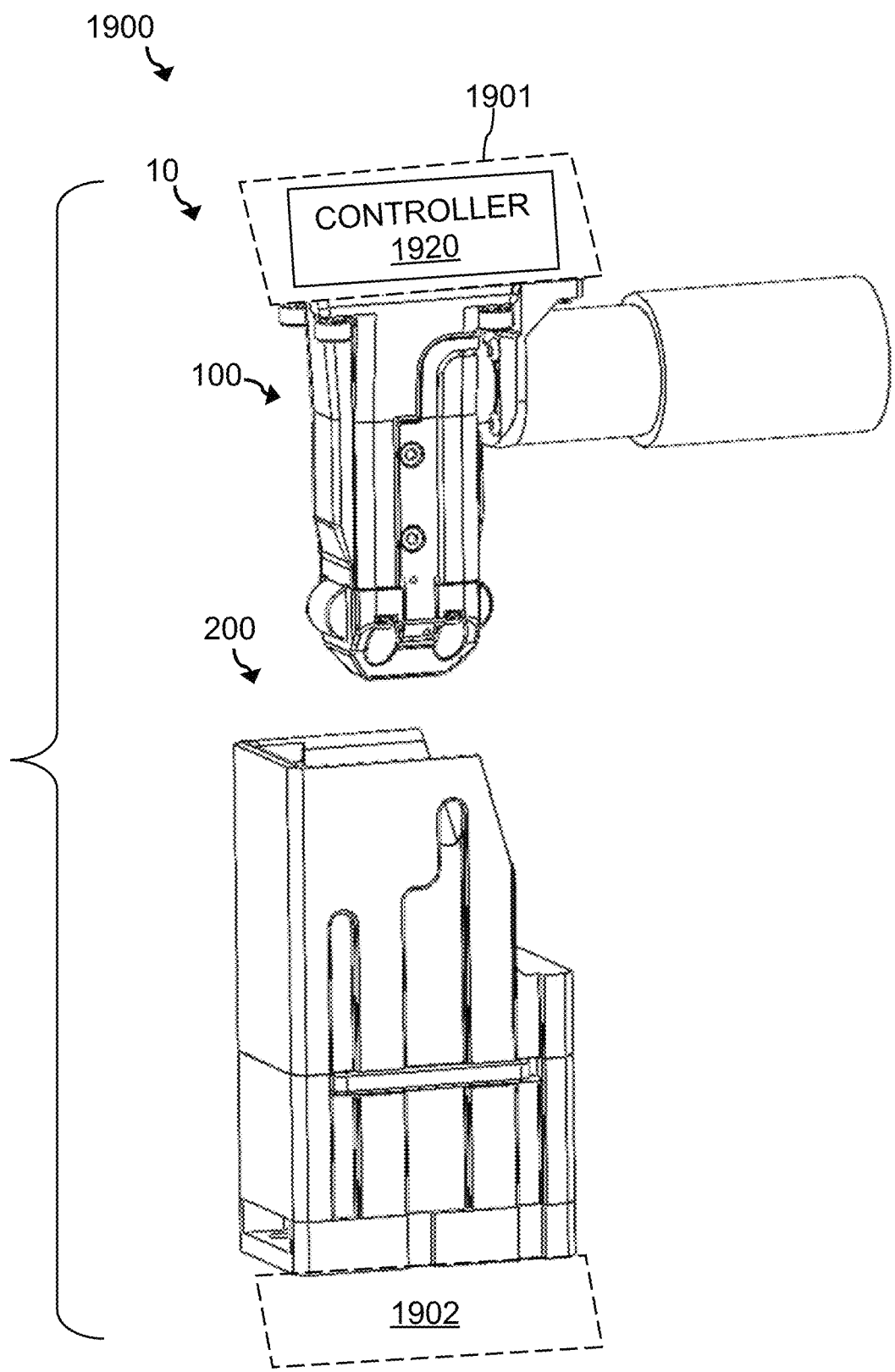
FIG. 19 is a perspective view of an assembly according to an embodiment.

FIG. 19 is a perspective view of an assembly 1900 according to an embodiment. The assembly 1900 includes a self-aligning mechanical fastener 10, a first object 1901, and a second object 1902. The active apparatus 100 is attached and/or mechanically coupled to the first object 1901 (e.g., at a proximal end of the active apparatus 100). The passive apparatus 200 is attached and/or mechanically coupled to the second object 1902 (e.g., at a distal end of the active apparatus 100). When the self-aligning mechanical fastener 10 is in the locked state, the first and second objects 1901, 1902 are releasably mechanically coupled. In some embodiments, the first object 1901 can include a controller 1920 that can be the same as controller 1650. Each object 1901, 1902 can comprise a plate, a housing, a tray, a mechanical load, or another object.

Figure 20:
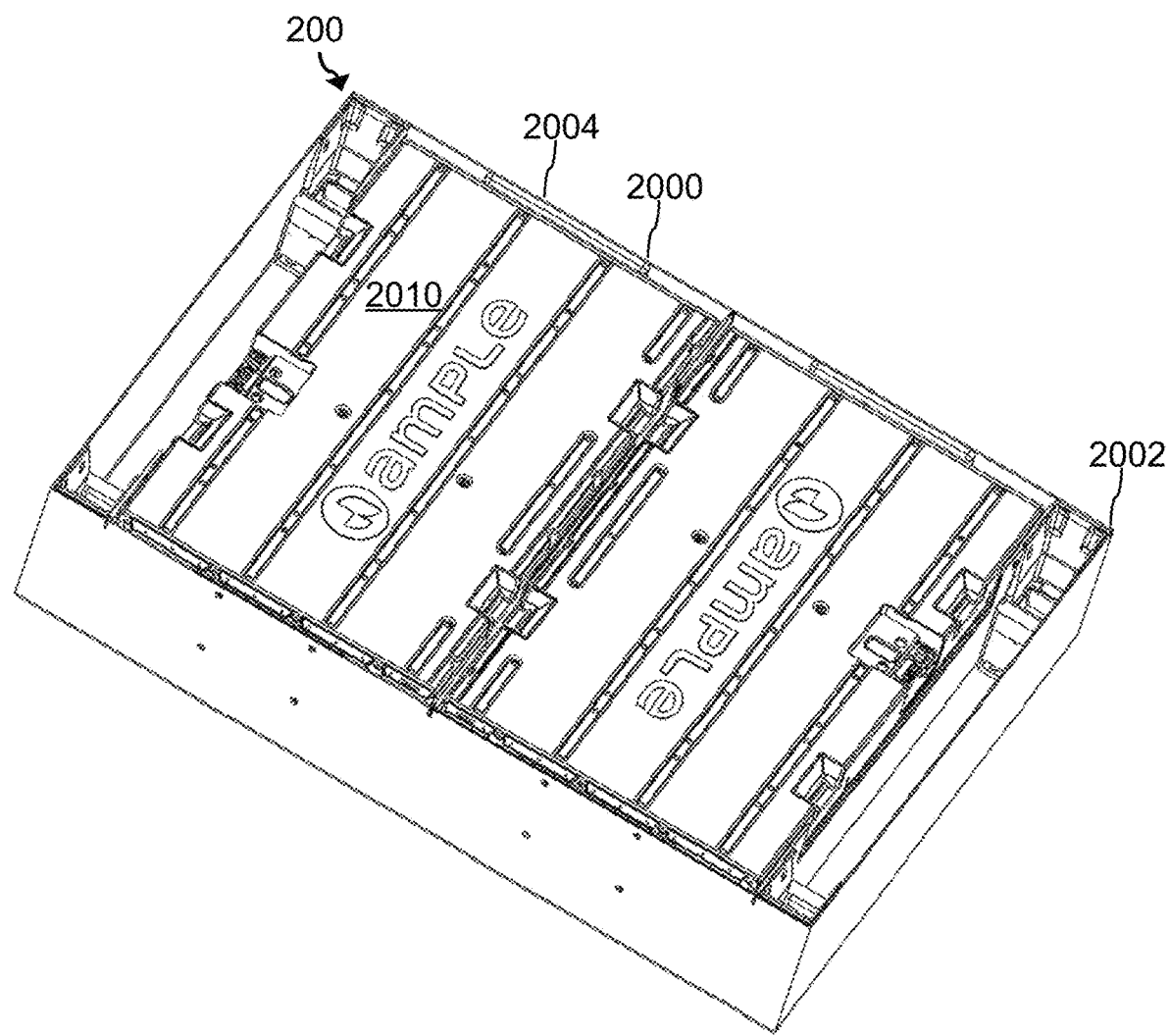
FIG. 20 is a perspective view of a battery tray according to an embodiment.
Figure 21:
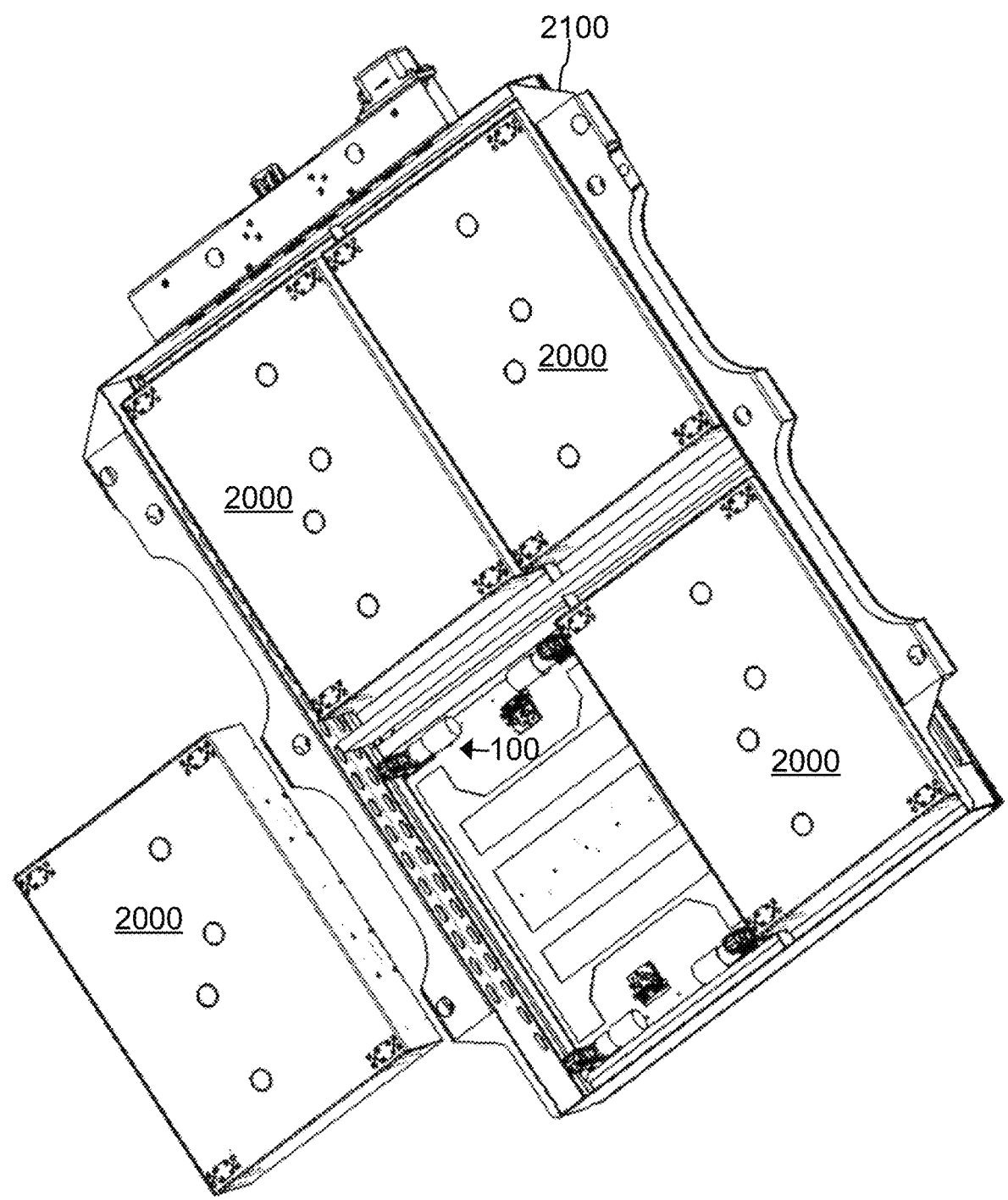
FIG. 21 is a perspective view and a partial exploded view of an interface plate and battery trays according to an embodiment.
Figure 22:
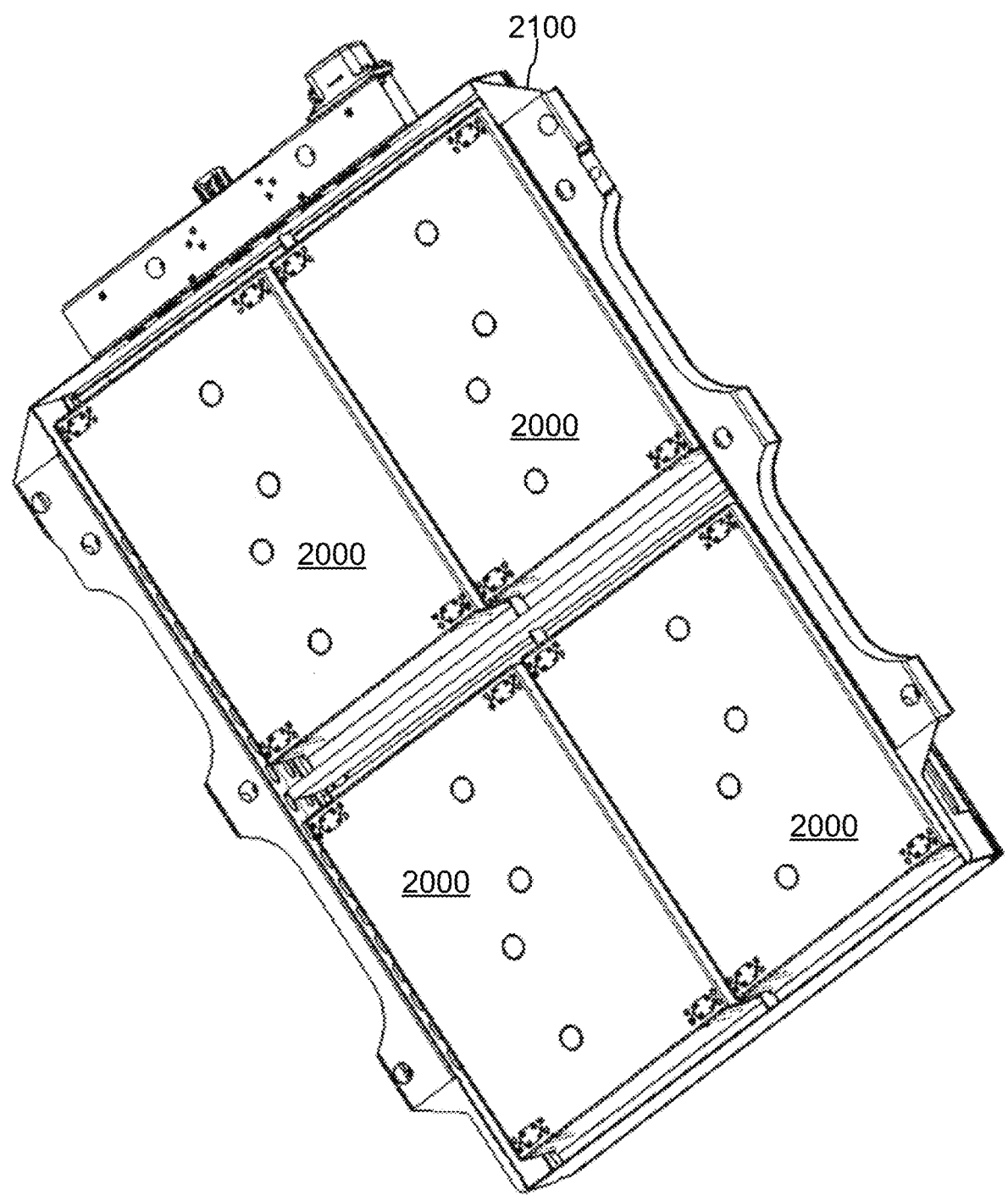
FIG. 22 is a perspective view of the interface plate and battery trays illustrated in FIG. 20.

FIG. 20 is a perspective view and partially-exploded view of a battery tray 2000 according to an embodiment. The battery tray 2000 is configured to hold one or more battery modules 2010. A passive apparatus 200 is preferably located in each corner 2002 of the battery tray 2000. Each passive apparatus 200 is mechanically coupled to the housing 2004 of the battery tray 2000. The passive apparatus 200 are configured to be releasably mechanically secured and locked to respective active apparatus 100, which can be mechanically coupled to an interface plate 2100, as illustrated in FIG. 21, which can be secured to the bottom of an electric vehicle. The interface plate 2100 can be mechanically coupled to multiple battery trays 2000 using the self-aligning mechanical fasteners 10. The interface plate 2100 and the battery tray 2000 can correspond to the first and second objects 1901, 1902, respectively. The battery trays 2000 can be raised and lowered to the interface plate 2100 using a lift such as a robotic lift. One of the battery trays 2000 is illustrated in the partially-exploded view in FIG. 21 to show the active apparatus 100 on the interface plate 2100 that correspond to the exploded-view battery tray 2000. All of the battery trays 2000 are mechanically coupled to the interface plate 2100 using the self-aligning mechanical fasteners 10 in FIG. 22.

Figure 23:
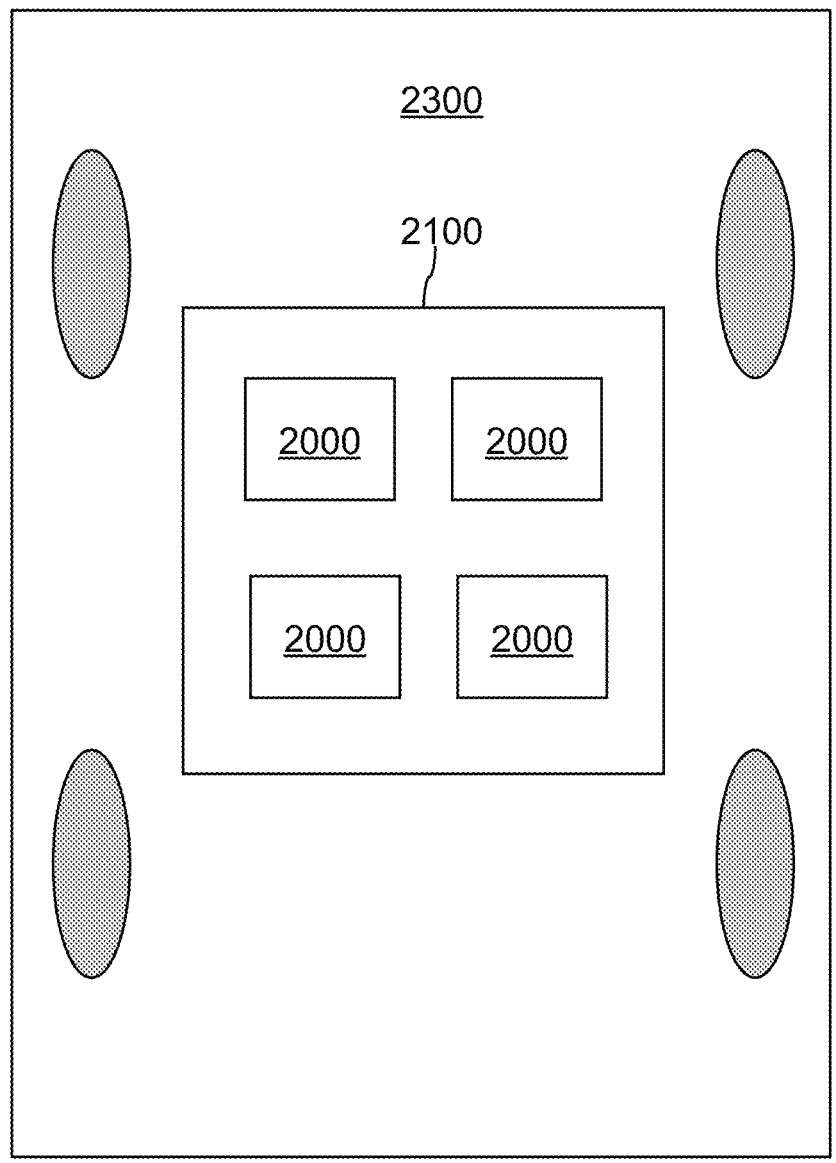
FIG. 23 is a block diagram of the bottom of an electric vehicle according to an embodiment.

FIG. 23 is a block diagram of the bottom of an electric vehicle 2300 onto which the interface plate 2100 has been mechanically secured. A plurality of battery trays 2000 are releasably attached (e.g., locked) to the interface plate 2100 using the self-aligning mechanical fasteners 10. In a preferred embodiment, a plurality of passive assemblies 200 are mechanically coupled to the battery trays 2000 and a plurality of active assemblies 100 are mechanically coupled to the interface plate 2100. In another embodiment, a plurality of active assemblies 100 are mechanically coupled to the battery trays 2000 and a plurality of passive assemblies 200 are mechanically coupled to the interface plate 2100. In another embodiment, active and passive assemblies 100, 200 are mechanically coupled to both the battery trays 2000 and to the interface plate 2100.

In some embodiments, the interface plate 2100 can be the same as or substantially the same as the interface plate disclosed in U.S. patent application Ser. No. 17/221,510, titled "Interface for Coupling Electric Battery and Vehicle Systems," filed on Apr. 2, 2021, which is hereby incorporated by reference.

Figure 24:
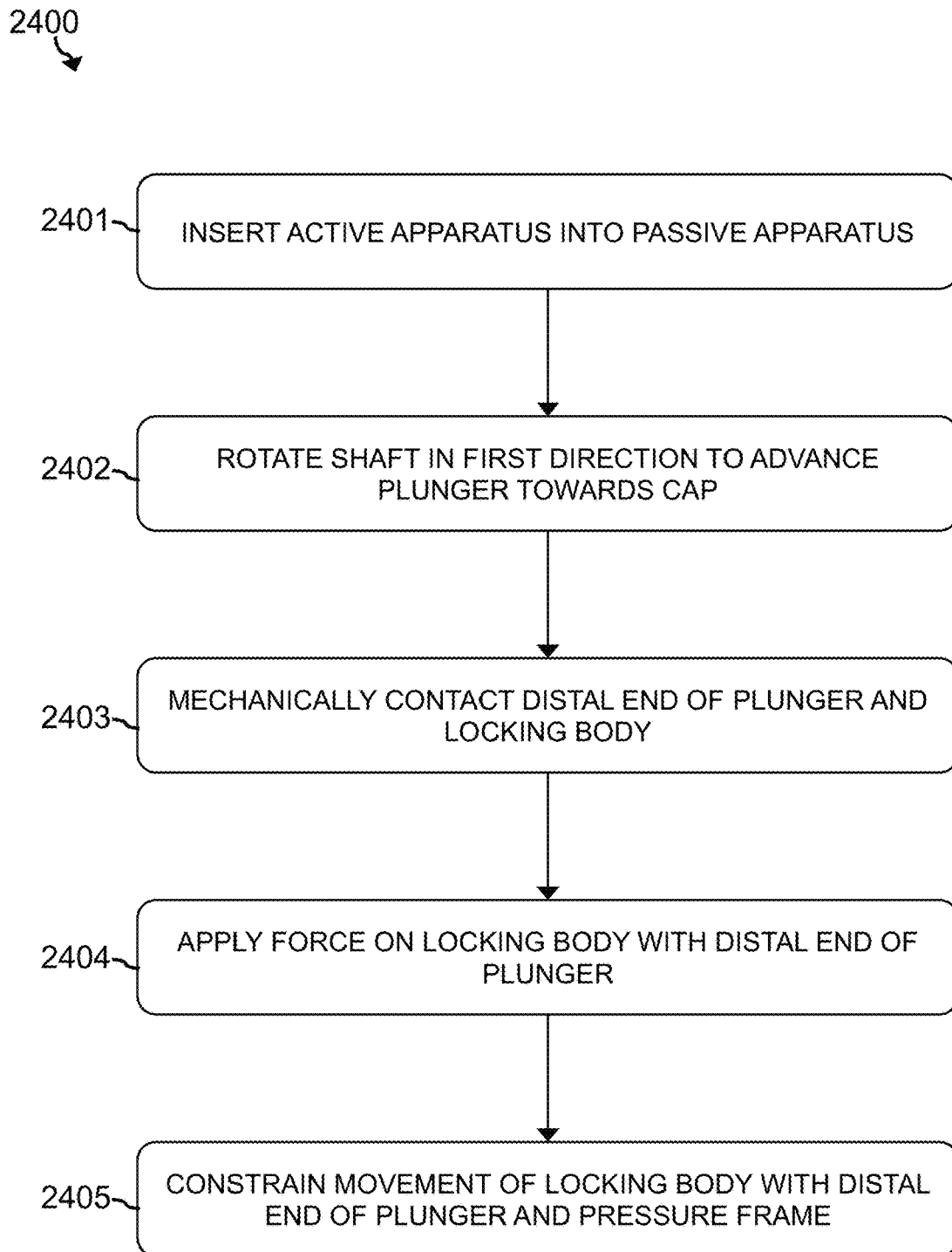
FIG. 24 is a flow chart of a method for releasably mechanically coupling objects according to an embodiment.

FIG. 24 is a flow chart of a method 2400 for releasably mechanically coupling objects according to an embodiment. Method 2400 can be performed with self-aligning mechanical fastener 10, assembly 1900, the interface plate 2100 and battery modules 2000, or electric vehicle 2300.

In step 2401, an active apparatus 100 is inserted into a passive apparatus 200. The active apparatus 100 is mechanically coupled to a first object, such as object 1901 or an interface plate 2100. The passive apparatus is mechanically coupled to a second object, such as object 1902 or a battery module 2000.

In step 2402, the motor 160 rotates the shaft 120 in a first direction relative to the first axis 300 to advance the plunger 130 towards the cap 140. Rotating the shaft 120 causes the threaded region 122 of the shaft 120 to rotationally engage the internal threads 560 defined in the plunger channel 530.

In step 2403, the tapered distal end 502 of the plunger 130 mechanically contacts the locking body(ies) 150, for example as illustrated in FIG. 14.

In step 2404, the tapered distal end 502 of the plunger 130 applies a force (e.g., a lateral force) on the locking body(ies) 150 that causes the locking body(ies) 150 to mechanically engage the pressure frame 220 in the passive apparatus 200.

In step 2405, the tapered distal end 502 of the plunger 130 and the pressure frame 220 constrain movement of the locking body(ies) 150 to lock (e.g., mechanically secure) the active apparatus 100 to the passive apparatus 200.

The invention should not be considered limited to the particular embodiments described above. Various modifications, equivalent processes, as well as numerous structures to which the invention may be applicable, will be readily apparent to those skilled in the art to which the invention is directed upon review of this disclosure. The above-described embodiments may be implemented in numerous ways. One or more aspects and embodiments involving the performance of processes or methods may utilize program instructions executable by a device (e.g., a computer, a processor, or other device) to perform, or control performance of, the processes or methods.

In this respect, various inventive concepts may be embodied as a non-transitory computer readable storage medium (or multiple non-transitory computer readable storage media) (e.g., a computer memory of any suitable type including transitory or non-transitory digital storage units, circuit configurations in Field Programmable Gate Arrays or other semiconductor devices, or other tangible computer storage medium) encoded with one or more programs that, when executed on one or more computers or other processors, perform methods that implement one or more of the various embodiments described above. When implemented in software (e.g., as an app), the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more communication devices, which may be used to interconnect the computer to one or more other devices and/or systems, such as, for example, one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Also, a computer may have one or more input devices and/or one or more output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

The non-transitory computer readable medium or media may be transportable, such that the program or programs stored thereon may be loaded onto one or more different computers or other processors to implement various one or more of the aspects described above. In some embodiments, computer readable media may be non-transitory media.

The terms "program," "app," and "software" are used herein in a generic sense to refer to any type of computer code or set of computer-executable instructions that may be employed to program a computer or other processor to implement various aspects as described above. Additionally, it should be appreciated that, according to one aspect, one or more computer programs that when executed perform methods of this application need not reside on a single computer or processor, but may be distributed in a modular fashion among a number of different computers or processors to implement various aspects of this application.

Computer-executable instructions may be in many forms, such as program modules, executed by one or more computers or other devices. Generally, program modules include routines, programs, objects, components, data structures, etc. that performs particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Thus, the disclosure and claims include new and novel improvements to existing methods and technologies, which were not previously known nor implemented to achieve the useful results described above. Users of the method and system will reap tangible benefits from the functions now made possible on account of the specific modifications described herein causing the effects in the system and its outputs to its users. It is expected that significantly improved operations can be achieved upon implementation of the claimed invention, using the technical components recited herein.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. A method for releasably mechanically coupling objects, comprising:
    inserting an active apparatus into a passive apparatus, the active apparatus mechanically coupled to a first object, the passive apparatus mechanically coupled to a second object,
    wherein:
        the active apparatus comprises:
            an active housing defining a channel that extends along a first axis;
            a shaft disposed in the channel and extending along the first axis, the shaft having external threads defined on a threaded region;
            a motor configured to rotate the shaft about the first axis;
            a plunger having a channel defined from a proximal end to a distal end of the plunger, the channel defined by an internal wall having internal threads that engage the external threads on the threaded region of the shaft, the distal end having a tapered shape;
            a cap attached to the active housing and disposed at a distal end of the shaft, the cap having a proximal surface and a distal surface, the proximal surface and the active housing defining a gap; and
            a locking body disposed on the proximal surface of the cap; and
        the passive apparatus comprises:
            an alignment housing having a hole that extends, parallel to the first axis, from a proximal end of the alignment housing towards a distal end of the alignment housing, the hole configured to receive the active housing, the proximal end of the alignment housing forming a tapered alignment guide defined by internal walls of the alignment housing such that the hole has a width that decreases from a proximal end of the alignment guide to a distal end of the alignment guide, the width measured with respect to a second axis that is orthogonal to the first axis; and
            a pressure frame disposed in a slot defined in the alignment housing, the hole extending through a hollow central region of the pressure frame;
    rotating, with the motor, the shaft in a first direction relative to the first axis to advance the plunger towards the cap;
    mechanically contacting the distal end of the plunger and the locking body;
    applying a force on the locking body with the distal end of the plunger, the force causing the locking body to mechanically engage the pressure frame; and
    constraining a movement of the locking body with the distal end of the plunger and the pressure frame to thereby mechanically secure the active apparatus to the passive apparatus.

* * * * *